United States Patent
Fijany et al.

(10) Patent No.: US 7,249,003 B2
(45) Date of Patent: Jul. 24, 2007

(54) SYSTEM FOR SOLVING DIAGNOSIS AND HITTING SET PROBLEMS

(75) Inventors: Amir Fijany, Pasadena, CA (US); Farrokh Vatan, West Hills, CA (US)

(73) Assignee: California Institute Of Technology, Pasadena, CA (US)

( * ) Notice: Subject to any disclaimer, the term of this patent is extended or adjusted under 35 U.S.C. 154(b) by 0 days.

(21) Appl. No.: 11/353,673

(22) Filed: Feb. 13, 2006

(65) Prior Publication Data

US 2006/0195302 A1 Aug. 31, 2006

Related U.S. Application Data

(60) Provisional application No. 60/652,459, filed on Feb. 11, 2005.

(51) Int. Cl.
*G06F 15/00* (2006.01)
(52) U.S. Cl. ............... 702/196; 702/183; 702/185; 714/26
(58) Field of Classification Search ........ 702/182–185, 702/189, 196; 714/26, 33, 47; 709/253
See application file for complete search history.

(56) References Cited

U.S. PATENT DOCUMENTS 5,566,092 A * 10/1996 Wang et al. ............... 702/185
5,808,919 A * 9/1998 Preist et al. ............... 702/183
5,922,079 A * 7/1999 Booth et al. ................ 714/26

OTHER PUBLICATIONS

A. Fijany, et al., "An advanced model-based diagnosis engine," Proc. 7th Int. Symp. On Artificial Intelligence, Robotics and Automation in Space, May 2003.
J. de Kleer, et al., "Characterizing diagnoses and systems," Artificial Intelligence, 56, 197-222, 1992.
G. Rote, "Path problems in graphs," Computing, vol. 7, pp. 155-189, 1990.
T. Hogg, et al., "Solving the really hard problems with cooperative search," Proc. Of AAAI-93, pp. 231-236, 1993.
B.C. Williams, et al., "A model-based approach to reactive self-configuring systems," Proc. 13th Nat. Conf. Artif. Intell. (AAAI-96), pp. 971-978, 1996.

(Continued)

*Primary Examiner*—John Barlow
*Assistant Examiner*—John Le
(74) *Attorney, Agent, or Firm*—Tope-McKay & Associates

(57) ABSTRACT

The diagnosis problem arises when a system's actual behavior contradicts the expected behavior, thereby exhibiting symptoms (a collection of conflict sets). System diagnosis is then the task of identifying faulty components that are responsible for anomalous behavior. To solve the diagnosis problem, the present invention describes a method for finding the minimal set of faulty components (minimal diagnosis set) that explain the conflict sets. The method includes acts of creating a matrix of the collection of conflict sets, and then creating nodes from the matrix such that each node is a node in a search tree. A determination is made as to whether each node is a leaf node or has any children nodes. If any given node has children nodes, then the node is split until all nodes are leaf nodes. Information gathered from the leaf nodes is used to determine the minimal diagnosis set.

20 Claims, 11 Drawing Sheets

OTHER PUBLICATIONS

S. Chung, et al., "Improving model-based mode estimation through offline compilation," Int. Symp. Artif., Intell., Robotics, Automation Space (ISAIRAS-01), 2001.

F. Wotawa, "A variant of Reiter's hitting-set algorithm," Information Processing Letters 79, 45-51, 2001.

J. de Kleer, et al., "Diagnosing Multiple Faults," Readings in Model-Based Diagnosis, Morgan Kaufmann Publishers, San Mateo, CA 1992.

* cited by examiner $$A = \begin{array}{c|cccc} & m_1 & m_2 & \cdots & m_n \\ \hline C_1 & 1 & 0 & \cdots & 0 \\ C_2 & 0 & 1 & \cdots & 1 \\ \vdots & \cdots & \cdots & \cdots & \cdots \\ C_m & 1 & 1 & \cdots & 0 \end{array}$$

FIG. 4

| Size of the Matrix | Size of the Hitting Set | Upper Bound | Lower Bound |
|---|---|---|---|
| 43x21 | 3 | 3 | 2 |
| 17x21 | 6 | 7 | 3 |
| 17x33 | 5 | 5 | 4 |
| 159x25 | 4 | 4 | 2 |
| 39x25 | 7 | 8 | 2 |
| 21x38 | 5 | 5 | 3 |
| 23x38 | 6 | 6 | 4 |
| 27x40 | 6 | 8 | 2 |
| 21x60 | 7 | 8 | 6 |
| 78x63 | 13 | 18 | 7 |
| 94x76 | 16 | 22 | 8 |

FIG. 5

Upper_Bound [A]
/* returns an upper bound for the solution of $Ax \geq b$ */

$U_1 \leftarrow 1$
$a_1 \leftarrow$ a maximum-weight column of A
$A_1 \leftarrow$ submatrix of A obtained by deleting the column $a_1$ and all rows
 of A that correspond to non-zero components of $a_1$
if $A_1$ is the empty matrix return $U_1$
 else return $U_1$ + Upper_Bound [$A_1$]

end if

FIG. 6

|  | Traditional Branch-and-Bound | | New Branch-and-Bound | |
| --- | --- | --- | --- | --- |
| Size of the matrix | Time (seconds) | Size of the tree | Time (seconds) | Size of the tree |
| 30×20 | 0.0045 | 63.49 | 0.00016 | 32.1 |
| 40×30 | 0.018 | 186.35 | 0.0017 | 130.48 |
| 35×40 | 0.027 | 283.65 | 0.0028 | 125.46 |
| 50×40 | 0.059 | 514.8 | 0.0077 | 311.72 |
| 40×50 | 0.07 | 634.1 | 0.005 | 207.22 |
| 60×45 | 0.164 | 1200.38 | 0.0163 | 609.94 |
| 70×50 | 0.406 | 2754.06 | 0.048 | 1617.6 |
| 80×55 | 0.917 | 5676.74 | 0.123 | 3544.24 |
| 100×90 | 13.469 | 55836.7 | 1.82 | 20841.4 |
| 120×90 | 18.55 | 65984.1 | 1.246 | 22269.9 |
| 130×100 | 40.85 | 123596 | 1.87 | 29093.6 |
| 150×120 | 177.475 | 427467 | 3.658 | 46474.9 |

FIG. 8

SYSTEM FOR SOLVING DIAGNOSIS AND HITTING SET PROBLEMS

PRIORITY CLAIM

This is a non-provisional application claiming the benefit of priority of U.S. Provisional Application No. 60/652,459, filed on Feb. 11, 2005, entitled, "New High Performance Algorithmic Solution for Diagnosis Problems."

GOVERNMENT RIGHTS

The invention described herein was made in the performance of work under a NASA contract, and is subject to the provisions of Public Law 96-517(35 USC 202) in which the Contractor has elected to retain title.

FIELD OF INVENTION

The present invention relates to techniques for solving diagnosis problems, and more particularly, to a system and method using an algorithmic method for solving diagnosis problems.

BACKGROUND OF INVENTION

Technological advances have led to the conception of a variety of complex devices and systems. When a system fails, a technician or user typically fixes the system by identifying and replacing (or fixing) the failed component. To ease this process, a variety of model-based diagnostic tools have been developed that assist a user in identifying the failed component.

A diagnosis problem arises when a system's actual behavior fails to match the expected behavior, thereby exhibiting symptoms (anomalies). System diagnosis is then the task of identifying faulty components that are responsible for anomalous behavior. To solve the diagnosis problem, one typically finds the minimal set of faulty components that explain the observed symptoms. The most disciplined technique to diagnosis is termed "model-based" because it employs knowledge of devices' operations and their connectivities in the form of models. The model-based approach reasons from first principles and affords far better diagnostic coverage of a system than traditional rule-based diagnosis methods, which are based on a collection of specific symptom-to-suspect rules.

The diagnosis process starts with identifying symptoms that represent inconsistencies (discrepancies) between the system's model (description) and the system's actual behavior. Each symptom identifies a set of conflicting components (i.e., conflict set) as initial candidates. A minimal diagnosis set is the smallest set of components that intersects all conflict sets. The underlying general approach in different model-based diagnosis approaches can be described as a two-step "divide-and-conquer" technique wherein finding the minimal diagnosis set is accomplished in two steps: 1) Generating conflict sets from symptoms; and 2) Calculating minimal diagnosis set from the conflict sets. As shown in FIG. 1, the conflict generation corresponds to forming a collection of conflict sets 100, and calculating the minimal diagnosis 102 corresponds to the solution of the Hitting Set problem for this collection. The Hitting Set is the solution that would explain all of the symptoms.

However, there are major drawbacks in the current model-based diagnosis techniques in efficiently performing the above two steps that severely limit their practical application to many systems of interest. First, existing conflict-generating algorithms are all based on various versions of the constraint propagation method and truth maintenance systems. The problem with these methods is that not only do they need exponential time, but they also require exponential memory to be implemented. Therefore, these methods cannot handle realistic systems with a large number of components. Second, in order to find the minimal diagnosis set, current model-based diagnosis techniques rely on algorithms with exponential computational costs and thus, are highly impractical for application to many systems of interest.

Thus, a continuing need exists for a system that allows a user to efficiently identify a minimal diagnosis set for complex systems with a large number of components.

SUMMARY OF INVENTION

The present invention relates to a method for calculating a minimal Hitting Set from a collection of sets. The method includes an act of using a computer system to analyze a system having a collection of sets to derive the minimal Hitting Set from the collection of sets. The computer system is configured to perform multiple acts to determine the minimal Hitting Set. For example, the computer system is configured to perform acts of receiving information regarding the collection of sets from the system; creating an incidence matrix of the collection of sets; creating nodes from the incidence matrix such that each node is a node in a search tree and has a label that includes a sub-matrix of the incidence matrix, and two disjoint subsets of the columns of the incidence matrix; calculating an upper bound and calculating a lower bound for each label, where the upper bound and lower bound define a range of solutions for the minimal Hitting Set; and determining whether each label has any child nodes or is a leaf node without any child nodes. If the label does not have any child nodes, then stopping the process and designating the label as a leaf node. If the label does have a child node, then splitting the label to create two new labels. Finally, repeating acts of calculating and determining until all labels have been designated as leaf nodes, with information gathered from leaf nodes determining a solution of the Hitting Set, thereby allowing a user to identify the Hitting Set.

In the act of calculating the minimal Hitting Set, the minimal Hitting Set is a minimal diagnosis set and the collection of sets is a collection of conflict sets. In this aspect, the method for calculating a minimal Hitting Set calculates a solution for a diagnosis problem.

In the act of creating an incidence matrix, the incidence matrix is created as a binary matrix denoted as m×n binary matrix A having columns and rows. The columns of matrix A are labeled by numbers $1, 2, \ldots, n$, and any subset of these columns are denoted as a subset of $\{1, 2, \ldots, n\}$.

In the act of creating nodes, each node has a label ($\lambda$) in a form of $\lambda = (M, T_{in}, T_{out})$. Additionally, $M$ is a sub-matrix of matrix $A$, and $T_{in}$ and $T_{out}$ are disjoint subsets of the columns of matrix A. $T_{in}$ denotes a set of columns of matrix A considered as part of the minimal diagnosis set. Alternatively, $T_{out}$ denotes a set of columns of matrix A that are considered not as part of the minimal diagnosis set.

The act of calculating an upper bound further comprises acts of calculating a value for the upper bound of $\lambda = (M, T_{in}, T_{out})$ and a calculating an upper bound set, by performing the following acts:

Initializing the value of the upper bound as U=size of $T_{in}$ and initializing the upper bound set as the set $T_{in}$. The size of $T_{in}$ is the number of elements in $T_{in}$;

Choosing a column $a_1$ of M with a maximum weight. The column with the maximum weight is the column of M with the largest number of 1's;

Increasing the value of U by 1 and adding the column $a_1$ to the upper bound set;

Constructing the matrix $M_1$ from M by deleting the column $a_1$ and all rows of M that correspond with non-zero components of the column $a_1$. If the matrix $M_1$ is empty then the current value of U is the upper bound and a solution for the Hitting Set is the upper bound set; otherwise Repeating the acts of choosing through repeating on the matrix $M_1$.

In the act of calculating a lower bound, a value for the lower bound of $\lambda=(M, T_{in}, T_{out})$ is equal to the size of $T_{in}$ plus k/L. k denotes the number of rows of the matrix M and L denotes the maximum weight of the columns of M.

In the act of determining whether each label has any child nodes or is a leaf node without any child nodes, a label is determined to be a leaf node if any of the following are true:

if $T_{in} \cup T_{out} = \{1,2, \ldots ,n\}$, where $\cup$ denotes the union of two sets;

if the value for the lower bound of $\lambda \geq$ the current value for the upper bound;

if the columns of $T_{in}$ form a solution such that if the columns in $T_{in}$ are added together to form a resulting vector, then the resulting vector has no zero component; or if M contains an all-zero row.

In another aspect, the act of splitting the label to create two new labels further comprises an act of splitting label $\lambda=(M, T_{in}, T_{out})$ into label $\lambda_0$ and label $\lambda_1$. Label $\lambda_0$ is defined as:

$\lambda_0=(\text{Remove\_0 }[M, j], T_{in}, T_{out} \cup \{\hat{j}\})$.

j denotes a column of M with a maximum weight and $\hat{j}$ is the corresponding column in the original matrix. Remove_0 [M, j] denotes a sub-matrix of M obtained by deleting the $j^{th}$ column of M. Label $\lambda_1$ is defined as:

$\lambda_1=(\text{Remove\_1 }[M, j], T_{in} \cup \{\hat{j}\}, T_{out})$.

Additionally, j denotes a column of M with a maximum weight and $\hat{j}$ is the corresponding column in the original matrix. Remove_1 [M, j] denotes a sub-matrix of M obtained by deleting the $j^{th}$ column of M and deleting all rows of M that correspond with non-zero components of that column.

In yet another aspect, the act of splitting a label further comprises acts of:

on label $\lambda=(M, T_{in}, T_{out})$, if the $j^{th}$ column of the matrix M is an all-one column, then changing the label $\lambda$ to the label $(\{\ \}, T_{in} \cup \{\hat{j}\}, T_{out})$, where $\cup$ denotes the union of two sets, $\{\ \}$ is an empty matrix and $\hat{j}$ is a corresponding column in the original matrix;

on label $\lambda=(M, T_{in}, T_{out})$, if the matrix M has a row of weight one, with 1 as its $j^{th}$ component, then changing the label $\lambda$ to the label (Removed_1 [M, j], $T_{in} \cup \{\hat{j}\}$, $T_{out}$) where $\cup$ denotes the union of two sets, $\hat{j}$ is the corresponding column in the original matrix, and Remove_1 [M, j] denotes a sub-matrix of M obtained by deleting the $j^{th}$ column of M and deleting all rows of M that correspond with non-zero components of that column;

on label $\lambda=(M, T_{in}, T_{out})$, if the matrix M has an all-one row, then deleting that row;

on label $\lambda=(M, T_{in}, T_{out})$, if $j^{th}$ column of the matrix M is an all-zero column, then changing the label $\lambda$ to the label (Remove_0 [M, j], $T_{in}$, $T_{out} \cup \{\hat{j}\}$), where $\cup$ denotes the union of two sets, $\hat{j}$ is the corresponding column in the original matrix, and Remove_0 [M, j] denotes a sub-matrix of M obtained by deleting the $j^{th}$ column of M;

on label $\lambda=(M, T_{in}, T_{out})$, if the matrix M has two equal rows, then deleting one of them; and repeating the above acts until all of the above acts are exhausted.

In yet another aspect, the method further comprises an act of applying a Branch-and-Bound technique to the incidence matrix A to find an optimal solution for the problem, comprising acts of:

initializing a label $\lambda_0$ as $\lambda_0=\text{Rules}*[\{A, \{\ \}, \{\ \}\}]$, where Rules* denotes applying and repeating the acts of paragraph 23 until all of the acts of paragraph 23 are exhausted;

initializing a set of labels as $\{\lambda_0\}$;

initializing a value of the upper bound U as the upper bound of $\lambda_0$;

initializing a solution set as the upper bound set of $\lambda_0$;

choosing a label $\lambda$ from the set of labels;

deleting $\lambda$ from the set of labels;

computing $U_1$ as the upper bound of $\lambda$ and its corresponding upper bound set;

if $U_1<U$, then changing the value of U to $U_1$ and the value of the solution set to the upper bound set;

if the label $\lambda$ is not a leaf, then splitting $\lambda$ to labels $\lambda_0$ and $\lambda_1$ and adding the new labels $\lambda_0$ and $\lambda_1$ to the set of labels;

if the set of labels is not empty, repeating the acts of choosing a label $\lambda$ through the act of repeating the acts;

if the set of labels is empty, then the outputting is the solution set and stopping.

In another aspect, the present invention also includes a system that is configured perform the acts above.

Finally, as can be appreciated by one skilled in the art, the present invention also includes a computer program product. The computer program product includes computer-readable instruction means stored on a computer-readable medium for causing a computer to perform the operations and acts described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4 is an illustration of a matrix, depicting a Hitting Set Problem being mapped onto Integer Programming;

FIG. 5 is a table illustrating exemplary test results of the present invention;

FIG. 6 illustrates an exemplary recursive procedure of pseudo-code for computing an upper bound;

FIG. 8 is a table illustrating the performance results of the algorithm of the present invention and its comparison with the traditional Branch-and-Bound method;

DETAILED DESCRIPTION

Figure 1:
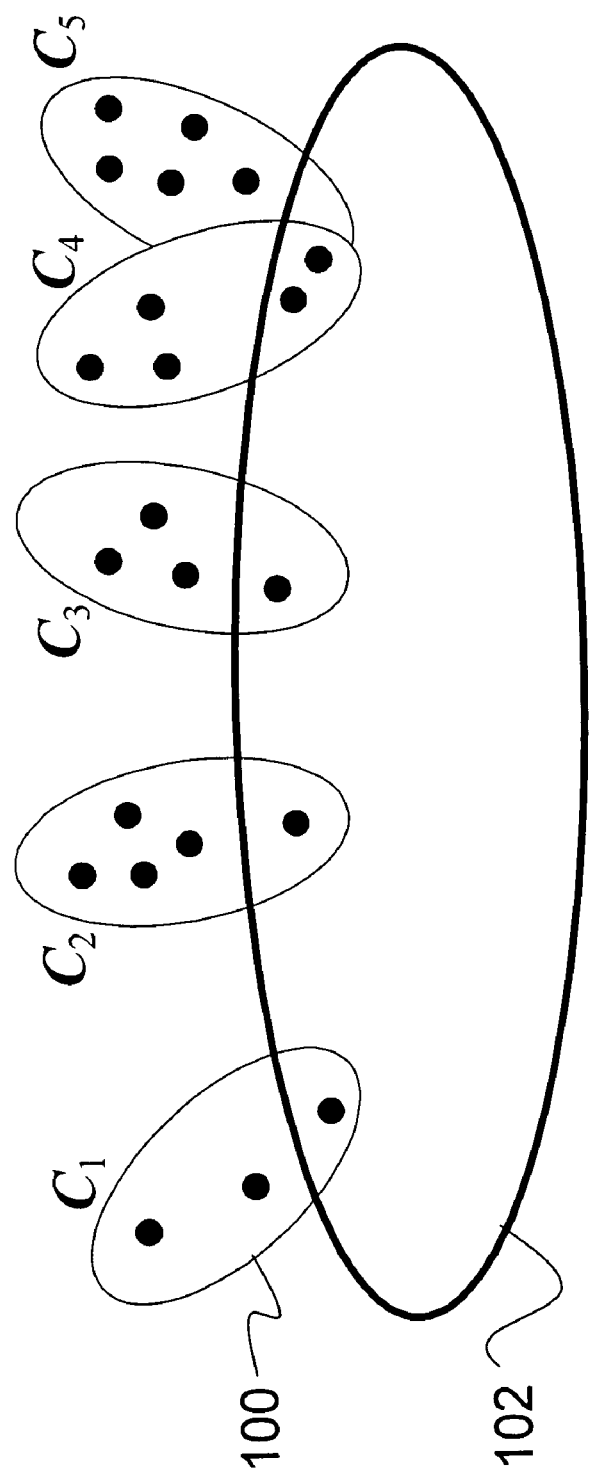
FIG. 1 is an illustration of an exemplary diagnosis of a Hitting Set of conflict sets.

The present invention relates to a solution for diagnosis problems, and more particularly, to a system and method using an algorithmic solution for diagnosis problems. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is provide. Next, a description of various principal aspects of the present invention is provided. Subsequently, an introduction is provided to provide the reader with a general understanding of the present invention. Finally, the details of various aspects of the present invention are provided to give an understanding of the specific details.

(1) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Conflict Set—The term "conflict set" as used with respect to the present invention refers to a set of components of the system such that the assumption of non-faultiness of all of them is not consistent with the model of the system and observations.

Hitting Set—The term "Hitting Set" as used with respect to the present invention, refers to a minimum set that intersects all conflict sets.

Incidence Matrix—The term "incidence matrix" as used with respect to the present invention refers to a 0/1 matrix whose rows are labeled by the conflict sets $\{C_1, C_2, \ldots, C_m\}$ and columns are labeled by the components of the systems $\{m_1, m_2, \ldots, m_n\}$, and the entry $a_{ij}=1$ if the $j^{th}$ component $m_j$ belongs to the $i^{th}$ conflict set $C_i$, otherwise $a_{ij}=0$.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e., computer operations coded into a computer chip). The "instruction means" may be stored in the memory of a computer or on a computer-readable medium such as a floppy disk, a CD-ROM, and a flash drive.

(2) Principal Aspects

The present invention has three "principal" aspects. The first is a system for solving diagnosis problems. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 2:
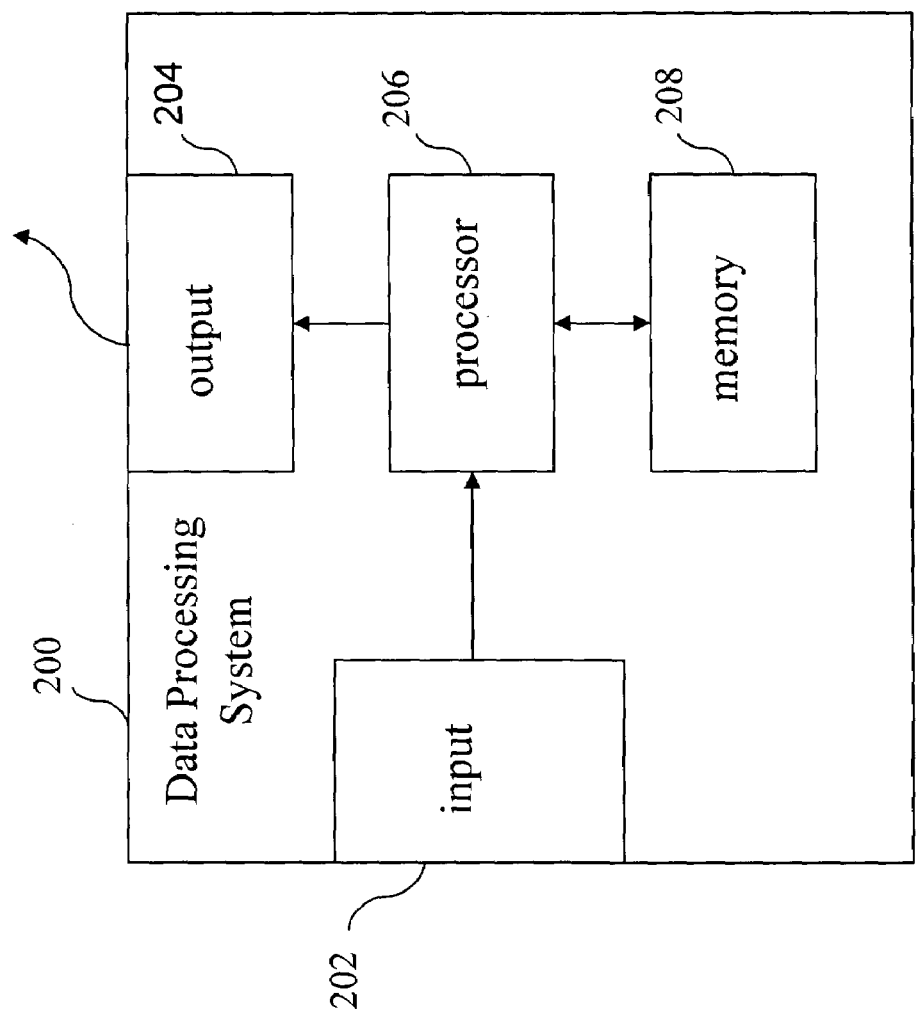
FIG. 2 is a block diagram depicting the components of a diagnosis system according to the present invention.

A block diagram depicting the components of a diagnosis system of the present invention is provided in FIG. 2. The diagnosis system 200 comprises an input 202 for receiving information from at least one component for use in detecting a conflict set. Note that the input 202 may include multiple "ports." Typically, input is received from at least one component, a non-limiting example of which includes a microcomputer within a larger, computer operated system. An output 204 is connected with the processor for providing information regarding the conflict set and diagnostic solution to the conflict set. Output may also be provided to other devices or other programs; e.g., to other software modules, for use therein. The input 202 and the output 204 are both coupled with a processor 206, which may be a general-purpose computer processor or a specialized processor designed specifically for use with the present invention. The processor 206 is coupled with a memory 208 to permit storage of data and software that are to be manipulated by commands to the processor 206.

Figure 3:
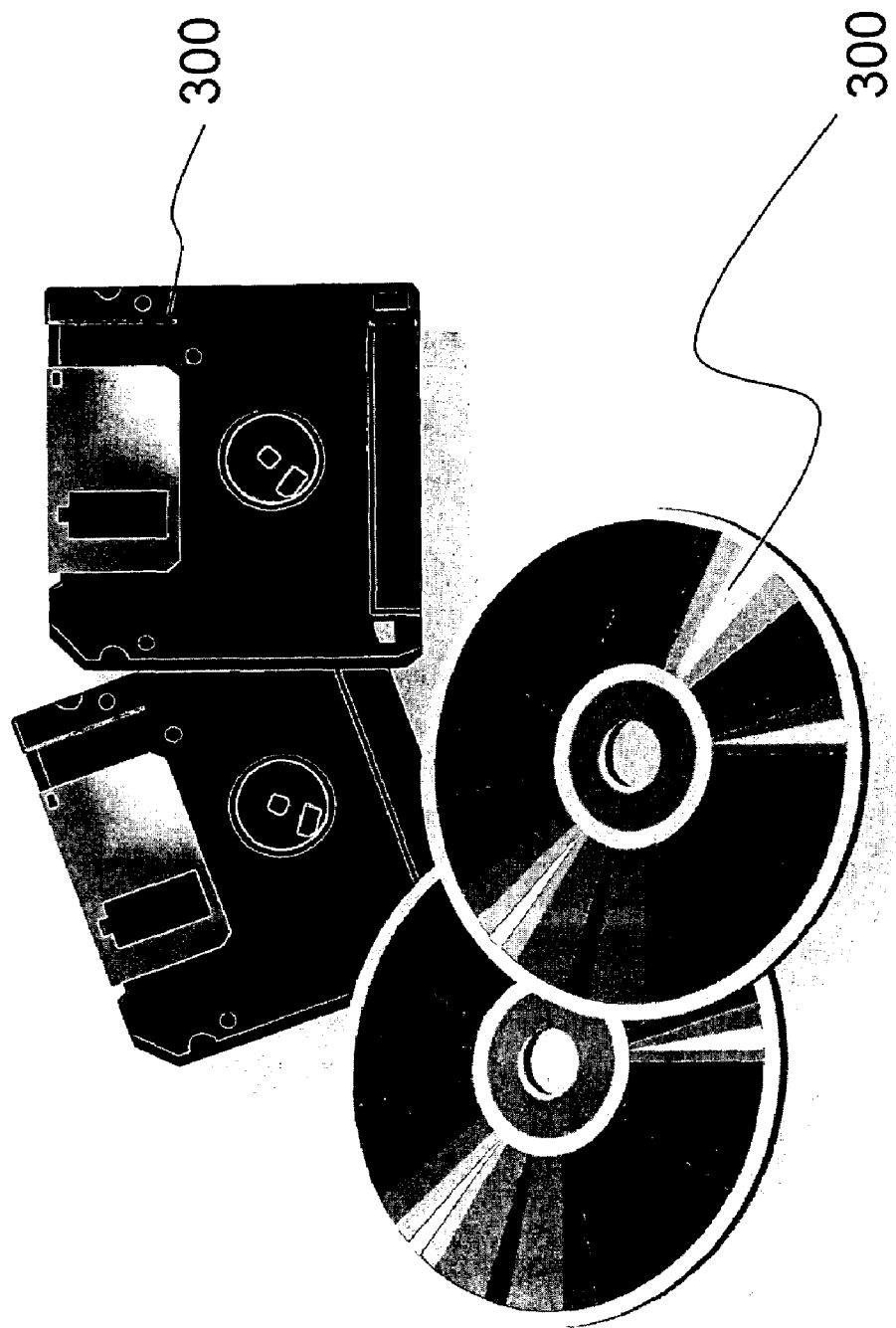
FIG. 3 is an illustrative diagram of a computer program product embodying the present invention.

An illustrative diagram of a computer program product embodying the present invention is depicted in FIG. 3. The computer program product 300 is depicted as an optical disk such as a CD or DVD. However, as mentioned previously, the computer program product generally represents computer-readable instructions stored on any compatible computer-readable medium.

(3) Introduction

The diagnosis problem arises when a system's actual behavior fails to match the expected behavior, thereby exhibiting symptoms (anomalies). System diagnosis is then the task of identifying faulty components that are responsible for anomalous behavior. To solve the diagnosis problem, one must find the minimal set of faulty components that explain the observed symptoms (i.e., minimal diagnosis set).

The present invention relates to a system for solving diagnosis problems by determining the lower and upper bounds on the size of the solution. The system uses these bounds to generate a solution window for the problem. The present invention also includes a Branch-and-Bound technique that is faster than existing techniques in terms of number of operations (by exploiting the structure of the problem). Using the concept of a solution window, the Branch-and-Bound technique allows a massive reduction (pruning) in the number of branches. Furthermore, as the Branch-and-Bound proceeds, the solution window is dynamically updated and narrowed to enable further pruning.

The present invention includes a powerful, yet simple, representation for calculating the minimal diagnosis set. This representation enables mapping onto a 0/1 Integer Programming problem. Mapping onto the 0/1 Integer Programming problem enables the use of a variety of algorithms that can efficiently solve the problem for up to several thousand components. The algorithms of the present invention are significantly improved over the existing ones, enabling efficient diagnosis of large, complex, systems. In addition, this mapping enables a fast determination of the lower and upper bounds on the solution (i.e., the minimum number of faulty components).

For further clarification, specific aspects of the present invention are described below. Additionally, tests were performed to further demonstrate the efficacy of the present invention. For further illustrative purposes, the results of performance tests of the present invention are compared with the traditional and standard algorithms. As shown below, the test results demonstrate that the present invention has a performance with more than ten times improvement over the traditional approach.

(4) Details of Specific Aspects

For clarity, various details of specific aspects of the present invention will be described in separate sub-sections below. The first section describes an algorithmic approach to the diagnosis problem. The second section describes the bounds on the diagnosis. The third section provides an introduction to the Branch-and-Bound method. The fourth section describes a Branch-and-Bound method according to the present invention. The fifth section describes performance results of the method of the present invention contrasted with a traditional Branch-and-Bound method. The sixth section explains mapping other problems into the Integer Programming Problem. And finally, the seventh section includes a brief summary of the present invention.

(4.1) Algorithmic Approach to the Diagnosis Problem

To overcome the complexity of calculating a minimal diagnosis set, the present invention relates the calculation and solution of the Hitting Set problem to the solution of Integer Programming problems.

The Hitting Set Problem, also known as the Transversal Problem, is one of the key problems in the combinatorics of finite sets and the theory of diagnosis. The problem is described as follows. A collection $S=\{S_1, \ldots, S_m\}$ of nonempty subsets of a set M is given. A Hitting Set of S is a subset H of M that intersects every set in the collection S. Of course, there are always trivial Hitting Sets. For example, the background set M is always a Hitting Set. However, interest remains in minimal Hitting Sets with minimal cardinality. A Hitting Set H is minimal if no proper subset of H is a Hitting Set.

FIG. 4 illustrates the mapping of the Hitting Set Problem onto Integer Programming. A 0/1 (binary) matrix A 400 is defined as the incidence matrix of the collection of the conflict sets. In other words, the entry $a_{ij}$ 402=1 if and only if the $j^{th}$ element $m_j$ 404 belongs to the $i^{th}$ set $C_i$ 406. Additionally, $x=(x_1, x_2, \ldots, x_n)$ is a binary vector. $x_j=1$ if the element $m_j$ 404 belongs to the minimal Hitting Set and hence the minimal diagnosis set, otherwise $x_j=0$. Thus, the Hitting Set Problem is shown as a 0/1 Integer Programming Problem in the following formulation:

$$\text{minimize } x_1+x_2+\ldots+x_n,$$

$$\text{subject to } Ax \geq b, x_j=0, 1, \quad (1)$$

where $b^T=(1, \ldots, 1)$ is a vector whose components are all equal to one. This mapping provides for the utilization of existing Integer Programming algorithms, such as commercially available Integer Programming tools.

(4.2) Bounds on the Diagnosis

The mapping of the present invention offers two additional advantages that can be exploited to develop yet more efficient algorithms. First, the mapping represents a special case of the Integer Programming Problem due to the structure of matrix A (i.e., a binary matrix) and vector b. Second, by using this mapping, the minimum number of faulty components can be determined without solving the problem explicitly. For this purpose, the 1-norm and 2-norm of vectors are defined as:

$$\|x\|_1 = \sum_{j=1}^n |x_j|, \|x\|_2 = \sqrt{\sum_{j=1}^n x_j^2}.$$

Using the above equations and vector b from the optimization problem (1), results in $\|b\|_1=m$ and $\|b\|_2=\sqrt{m}$. Because the elements of both vectors Ax and b are positive, the following two inequalities can be derived:

$$\left.\begin{array}{l}\|A\|_1 \times \|x\|_1 \geq m \Rightarrow \|x\|_1 \geq m/\|A\|_1 \\ \|A\|_2 \times \|x\|_2 \geq \sqrt{m} \Rightarrow \|x\|_2 \geq \sqrt{m}/\|A\|_2\end{array}\right\}, \quad (2)$$

where $\|$ denotes the norm, x denotes multiplication, and/ denotes division. Since x is a binary vector, then both norms in equation (2) give the bound on the size of the solution (i.e., the number of nonzero elements of vector x). The number of nonzero elements of vector x corresponds to the minimal diagnosis set. It should be noted that depending on the structure of the problem (i.e., the 1- and 2-norm of the matrix A and m), a sharper bound can be derived from either of the norms in equation (2). The present invention derives the bounds on the solution of the problem without explicitly solving the problem. Such a priori knowledge on the size of solution can be used for developing much more efficient algorithms for the problem.

Furthermore, an upper bound for the solution size can be found using monotonicity of the Integer Programming of optimization problem (1). Monotonicity means that if x is a solution of $Ax \geq b$ and $y \geq x$, then y is also a solution of the same system. Note that finding a 0/1 solution x for the system $Ax \geq b$ is equivalent to finding a subset of the columns of the matrix A, such that their sum is a vector with components all equal to or greater than 1. Any such solution provides an upper bound for the optimization problem (1), since that problem solves a minimal set of such columns.

Therefore, to find an upper bound, a column $C_1$ of A with the largest weight must first be chosen. Then, a submatrix of A is constructed by deleting the column $C_1$ and all rows of A that correspond to non-zero components of $C_1$. The same process is then applied to the new matrix (i.e., submatrix of A), until an empty matrix is derived. The columns $C_1$, $C_2$, ..., $C_t$ that are obtained determine a solution for $Ax \geq b$ and the number t is an upper bound for the solution of the Integer Programming problem of optimization problem (1). FIG. 5 is a table illustrating test results of the present invention, indicating that the upper bound is actually sharp, particularly for a small size solution. Note that it is easy to modify this algorithm in a way that it also provides a vector a, such that the vector Aa realizes the corresponding upper bound.

FIG. 6 illustrates an exemplary recursive procedure of pseudo-code for computing the upper bound. As can be appreciated by one skilled in the art, the pseudo-code shown in FIG. 6 is a non-limiting example of pseudo-code operable for computing the upper bound, and that the pseudo-code can be altered to provide the same or similar result.

There are two simple rules that assist the above algorithm in the following two extreme cases. The algorithm will likely end up with sub-matrices that these rules can be applied to. The rules are as follows:

1. If the matrix A has an all-one column, then the upper bound is equal to 1; and
2. If some row of the matrix A has weight 1, then remove that row and the corresponding column to obtain the matrix $A_1$ and Upper_Bound $[A]=1+$Upper_Bound $[A_1]$, where Upper_Bound $[A_1]$ and Upper_Bound $[A]$ denote the values of the upper bound for the corresponding matrices.

The upper bound can also be improved by a step-by-step method and in an iterative fashion. For example, the cost of the $k^{th}$ step in the iteration is of the order of $n^k$ (i.e., $O(n^k)$), where n is the number of the columns of the matrix. In this example, the first few steps are practically efficient. More specifically, for a fixed k, instead of choosing the maximum weight column for the vector $a_1$, the sum of k columns of A can be chosen, with all possible such vectors thereafter being tried.

As another application of the a priori lower bound, the cases where a high number of faulty components requires another course of action instead of usual identification of faulty components, can be separated. These cases can be separated before starting to solve the hard problem of finding the minimal Hitting Sets. Also a good lower and upper bound can determine whether the enhanced brute-force algorithm can provide a solution efficiently. As it was stated before, this algorithm has a complexity of $O(n^t)$, where t is the number of faulty components and n is the number of the columns of the matrix.

(4.3) Introduction to the Branch-and-Bound Method

The Branch-and-Bound method is one of the most common methods for solving intractable problems. In the case of the Integer Programming (IP) problem, this method traditionally begins by solving the Linear Programming (LP) relaxation of the IP (i.e., by removing the condition that the variables $x_j$, in the optimization problem (1) of paragraph 00066, are integers).

Figure 7:
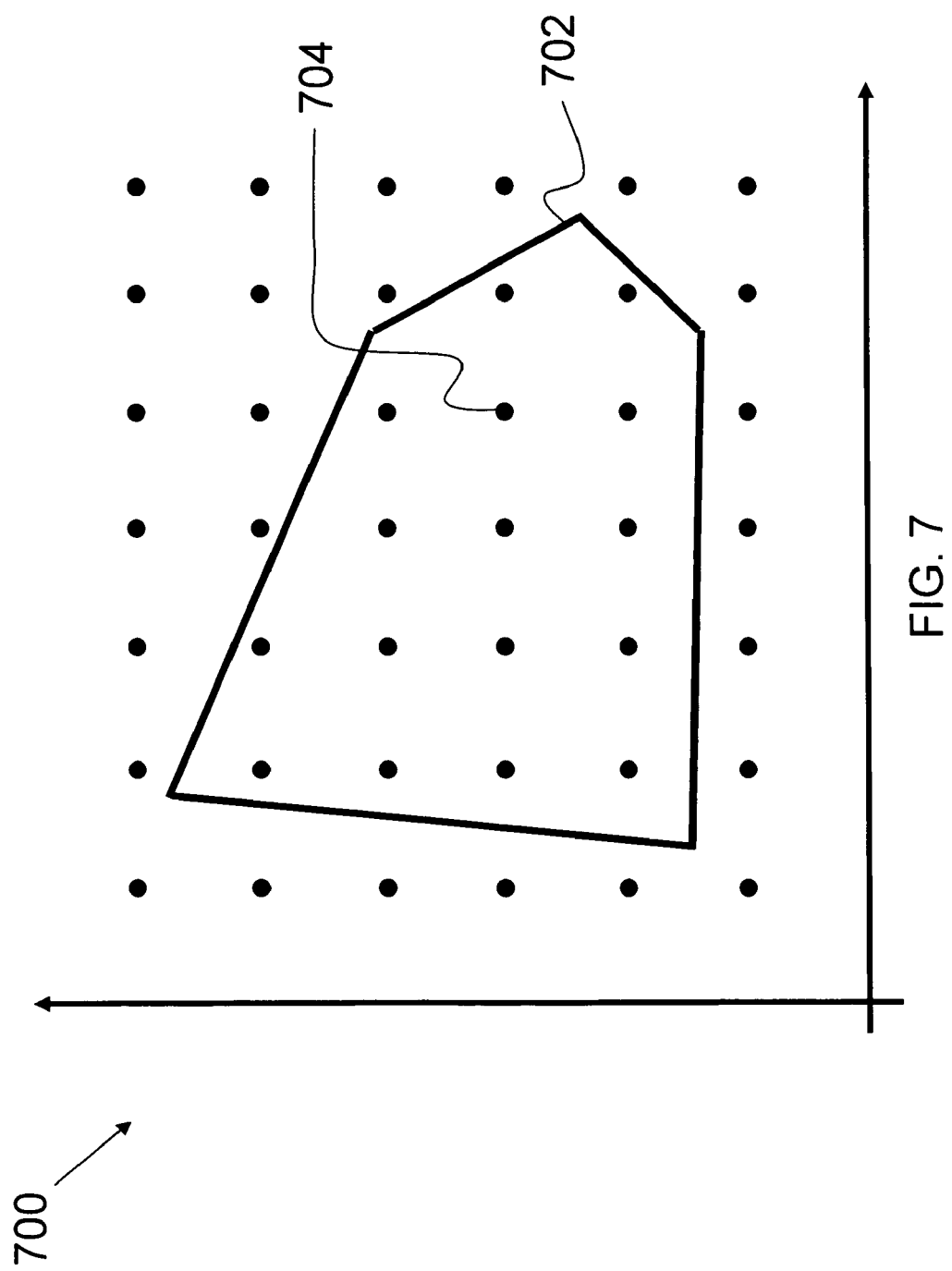
FIG. 7 is a graph illustrating typical solution sets of the Linear Programming (LP) relaxation and Integer Programming (IP) problems.

FIG. 7 is a graph 700 illustrating typical solution sets of the LP relaxation and IP problems. As shown in FIG. 7, the polygon 702 represents the solution set of the LP relaxation and the grid points 704 inside this polygon 702 represent the solution set of the IP problem.

If the optimal solution of the LP relaxation consists only of integer values, then the optimal solution of the LP relaxation will be the optimal solution for the IP problem.

Otherwise, if the IP problem is defined by a system such as the optimization problem (1), the optimal solution of the LP relaxation provides a lower bound for the IP problem. In such a case, one of the non-integer values of the optimal solution of the LP relaxation can be chosen (e.g., $x_j=a$), with two new sub-problems being defined by adding the conditions $x_j \leq [a]$ and $x_j \geq [a]+1$ to the system, where [a] denotes the integer part of a. Then, the two new sub-problems need to be solved. By continuing this procedure, the sub-problems of the original IP problem are defined. Once an integer optimal solution for the LP relaxation of a sub-problem is found, that solution gives us an upper bound for the IP problem. After finding such an integer solution, any sub-problem is eliminated whose (LP relaxation) lower bound is larger than the upper bound provided by some other sub-problem. This procedure is continued until all sub-problems are eliminated or an integer optimal solution is found for the corresponding LP relaxation problem. At the end, the optimal solution for the IP problem is the best of the optimal integer solutions of the sub-problems.

The above procedure can be generalized as follows. To begin the Branch-and-Bound method, the following acts need to be performed:

Partitioning a problem P into a collection $P_1, P_2, \ldots, P_k$ of mutually disjoint sub-problems;

Finding a lower bound for each sub-problem $P_j$;

Finding an integer solution for a subclass of sub-problems (in this case by obtaining an upper bound); and Optionally, determining whether the integer solution is optimal for the corresponding sub-problem.

Note that in the case of LP relaxation, whenever an integer solution for a sub-problem is found, it is guaranteed that it is an optimal solution for that sub-problem. Starting with the original problem P, defined by a system like the optimization problem (1), the $M^{th}$ step of the procedure provides partitions $P_{m,1}, P_{m,2}, \ldots, P_{m,t}$ of mutually disjoint sub-problems. For each sub-problem $P_{m,j}$, a lower bound $L_{m,j}$ is found and, if possible, an integer solution and corresponding upper bound $U_{m,j}$ is found. Then, a decision is made as to which sub-problems $P_{m,j}$ should be eliminated at this step. There are two criteria for this decision:

1. The lower bound $L_{m,j}$ is larger than upper bound $U_{m,k}$ of some other sub-problem $P_{m,k}$; and
2. An optimal solution for the sub-problem $P_{m,j}$ is found.

In the case of (2) (i.e., optimal solution is found), the record of the best optimal solution of the sub-problems is kept. Then, the act of partitioning a problem P into a collection of mutually disjoint sub-problems is applied to the remaining sub-problems and to find the lower and (if possible) upper bounds for the new sub-problems. This procedure is continued until no sub-problem remains. Then, the best of the optimal solutions of sub-problems is the optimal solution for the original problem.

(4.4) Branch-and-Bound Method of the Present Invention

The Branch-and-Bound algorithm of the present invention is based on the above methods for computing lower and upper bounds for diagnosis. The monotonicity property of the Integer Programming problem is also exploited. The rational behind this approach and its possible advantages over the standard Branch-and-Bound method, are as follows:

Since the optimal solution is one of the points on the discrete grid of FIG. 7, the relaxation phase of the present invention applies directly to the discrete grid. Alternatively, the standard method starts with a much larger set that consists of not only the discrete grid but also all real points inside the polygon.

Using the present invention, for each sub-problem, a lower bound in linear time is found. Conversely, the time of LP relaxation of the standard method is $O(n^3)$.

For each sub-problem, an upper bound can be found using the present invention. Alternatively, using the standard method, the upper bound is found only in cases where the LP relaxation of the sub-problem at hand ends up with an integer solution. Thus, the present invention provides a greater chance of eliminating sub-problems with large lower bounds.

Before describing the method according to the present invention, a set of useful functions and notation are introduced.

Matrix A is an m×n binary matrix. The columns of A are labeled by the numbers 1, 2, . . . , n, and any subset of these columns is denoted as a subset of $\{1, 2, \ldots, n\}$. Similar to the traditional Branch-and-Bound method, the algorithm of the present invention is also based on a search of the nodes of a tree. Each node of the search tree has a label of the form:

$$(M, T_{in}, T_{out}),$$

where M is a submatrix of the original matrix A, and $T_{in}$ and $T_{out}$ are disjoint subsets of the columns of the original matrix A. The meaning of this partition is that $T_{in}$ is the set of the columns (of the original matrix A) considered as part of the solution, while $T_{out}$ is the set of the columns (of the original matrix A) that are considered not to be part of the solution. Note that a solution of the optimization problem (1) can be considered as a subset of the columns of matrix A, whose addition is a vector with all non-zero components.

Following is a list of auxiliary functions and sub-routines that are used in implementing the method of the present invention. As can be appreciated by one skilled in the art, the titles and names are for illustrative purposes only and can be changed provided the operation provides the same or a similar result.

(4.4.1) Function Place Finding

Consider a node with the label (M, $T_{in}$, $T_{out}$). Since M is a submatrix of the original matrix A, every column of M corresponds with a unique column of A. As a non-limiting example, the column 1 of M corresponds with the column 3 of A and the column 2 of M corresponds with the column 7 of A, and so on. Therefore, using a placing finding function, the label of a column of M in A can be referred to without any ambiguity. In fact, given the sets $T_{in}$ and $T_{out}$, for every column j of M, it is possible to find the corresponding column in the original matrix A. For illustrative purposes, this relation is denoted by the function Place_Finding. Additionally, to keep the notation simple, instead of writing Place_Finding[$T_{in}$, $T_{out}$, j], ĵ alone may be used if the sets $T_{in}$ and $T_{out}$ are understood from the context.

(4.4.2) Function Remove 0 and Remove 1

As described in further detail below, a label can be split to create two new labels. For example, label $\lambda=(M, T_{in}, T_{out})$ can be split into label $\lambda_0$ and label $\lambda_1$. Label $\lambda_0$ is defined as:

$$\lambda_0=(\text{Remove\_0 } [M, j], T_{in}, T_{out}\cup\{\hat{j}\}),$$

where j denotes a column of M with a maximum weight, $\cup$ denotes the union of two sets, and ĵ is the corresponding column in the original matrix. As applied to this section, the function Remove_0 [M, j] denotes a sub-matrix of M obtained by deleting the $j^{th}$ column of M.

Additionally, label $\lambda_1$ is defined as:

$$\lambda_1=(\text{Remove\_1 } [M, j], T_{in}\cup\{\hat{j}\}, T_{out}),$$

where the function Remove_1 [M, j] denotes a sub-matrix of M obtained by deleting the $j^{th}$ column of M and deleting all rows of M that correspond with non-zero components of that column.

As a non-limiting example, consider the following matrix:

$$M = \begin{pmatrix} 0 & 0 & 1 & 1 \\ 1 & 1 & 0 & 1 \\ 1 & 0 & 1 & 0 \\ 0 & 1 & 0 & 1 \end{pmatrix}.$$

Then, to compute Remove_1 [M, 2], the $2^{nd}$ column of M is deleted. Since the $2^{nd}$ and $4^{th}$ elements (e.g., components) of this column are 1, the $2^{nd}$ and $4^{th}$ rows are deleted as well. The result is as follows:

$$\text{Remove\_1}[M, 2] = \begin{pmatrix} 0 & 1 & 1 \\ 1 & 1 & 0 \end{pmatrix}.$$

For the function Remove_0 [M, 2], only the $2^{nd}$ column of M is deleted. The result is as follows:

$$\text{Remove\_0}[M, 2] = \begin{pmatrix} 0 & 1 & 1 \\ 1 & 0 & 1 \\ 1 & 1 & 0 \\ 0 & 0 & 1 \end{pmatrix}.$$

(4.4.3) Function Rule*

This function is based on some rules that simplify the process of finding the optimal solution for the optimization problem (1):

Rule 1 If matrix A has an all-one column $C_j$, then the set consisting of the $j^{th}$ element $x_j$ alone is the Hitting Set; or the vector x with 1 at its $j^{th}$ component and zero at other components, is an optimal solution for the optimization problem (1).

Rule 2 If matrix A has a row of weight one, with 1 as its $j^{th}$ component, then the $j^{th}$ element $x_j$ is contained in the minimal Hitting Set. In this case, the optimization problem (1) can be simplified by removing this row and the $j^{th}$ column, with the $j^{th}$ element $x_j$ being added to the solution of the new system.

Rule 3 If matrix A has an all-one row, delete that row.

Rule 4 If matrix A has an all-zero column, delete that column.

Rule 5 If matrix A has two equal rows, delete one of them.

Following is a description of how the above Rules affect the labels of the nodes in the search tree, with the label of a node being denoted as (M, {$T_{in}$, $T_{out}$}).

First, the action of Rule 1 is described. If the matrix M does not have an all-one column (i.e., a column having elements all equal to "1"), then no action is performed and the label is unchanged. Otherwise, assume that the $j^{th}$ column is all-one. In such a case, Rule 1 changes the label to the following:

(Ø, $T_{in}\cup\{\tilde{j}\}$, $T_{out}$), where Ø denotes an empty matrix and ∪ denotes the union of two sets (i.e., the union of $T_{in}$ and $\tilde{j}$ (the corresponding column in the original matrix)).

In a more formal language, function Rule_1 is defined on a set of labels as follows:

$$\text{Rule\_1}[(M, T_{in}, T_{out})] = \begin{cases} (M, T_{in}, T_{out}), \\ (\varnothing, T_{in} \cup \{\tilde{j}\}, T_{out}), \end{cases}$$

if M has no all—one columns, if the jth column is an all—one column.

To define the action of Rule 2, first a useful notation is introduced. $e_j$ denotes the unit binary vector (of weight one) with its only 1 component at $j^{th}$ position. The action of Rule 2 can now be described by the following function:

$$\text{Rule\_2}[(M, T_{in}, T_{out})] = \begin{cases} (\text{Remove\_1}[M, j], T_{in} \cup \{\tilde{j}\}, T_{out}), \\ (M, T_{in}, T_{out}), \end{cases}$$

if M has a row equal to $e_j$, otherwise.

The action of Rule 3 is described by the following function:

$$\text{Rule\_3}[(M, T_{in}, T_{out})] = \begin{matrix} (M', T_{in}, T_{out}), \\ (M, T_{in}, T_{out}), \end{matrix}$$

if M has all-one rows, otherwise, where M' is obtained from M by deleting all all-one rows.

The action of Rule 4 is described by the following function:

$$\text{Rule\_4}[(M, T_{in}, T_{out})] = \begin{cases} (\text{Remove\_0}[M, j], T_{in}.T_{out} \cup \{\tilde{j}\}), \\ (M, T_{in}, T_{out}), \end{cases}$$

if the $j^{th}$ column of M is all-zero, otherwise.

Finally, the following function describes Rule 5:

$$\text{Rule\_5}[(M, T_{in}, T_{out})] = \begin{cases} (M', T_{in}, T_{out}), \\ (M, T_{in}, T_{out}), \end{cases}$$

if M has two equal rows, otherwise, where the matrix M' is obtained from M by deleting one of the equal rows.

Note that once one of these rules is applied on a label $\lambda_1$=(M, $T_{in}$, $T_{out}$), and the result is the label $\lambda_2$, then it may be possible to apply one of these rules to $\lambda_2$, and so on. For this reason, the Function Rule* is defined on the set of labels as repeated applications of Rules_1-5, until none of the rules can be applied anymore. It is easy to show that Rule* is well-defined (i.e., the result of Rule*($\lambda$) does not depend on the order that the functions Rule_1 and Rules_2 are applied). As a non-limiting example, consider the following label:

$\lambda_1$=($M_1$, Ø, Ø), where $$M_1 = \begin{pmatrix} 0 & 0 & 1 & 0 & 1 \\ 0 & 1 & 0 & 0 & 0 \\ 0 & 0 & 0 & 1 & 0 \\ 1 & 0 & 1 & 1 & 1 \\ 1 & 0 & 1 & 0 & 0 \\ 0 & 0 & 1 & 1 & 1 \end{pmatrix}.$$

The $2^{nd}$ row of M is equal to $e_2$ and its $3^{rd}$ row is equal to $e_4$. Therefore, when applying Rule_2 there are two possible choices. First, the $2^{nd}$ row is removed, the result is the label $\lambda_2$=($M_2$, {2}, Ø), where $$M_2 = \begin{pmatrix} 0 & 1 & 0 & 1 \\ 0 & 0 & 1 & 0 \\ 1 & 1 & 1 & 1 \\ 1 & 1 & 0 & 0 \\ 0 & 1 & 1 & 1 \end{pmatrix}.$$

The $2^{nd}$ row of $M_2$ is equal to $e_3$, thus Rule_2 can be applied. The result is the label $\lambda_3$=($M_3$, {2, 4}, Ø), where $$M_3 = \begin{pmatrix} 0 & 1 & 1 \\ 1 & 1 & 0 \end{pmatrix}.$$

Note that the $3^{rd}$ column of $M_3$ is the $4^{th}$ column of the original matrix $M_1$. Finally, Rule_1 is applied and the result is the label $\lambda_4$=(Ø, {2, 3, 4}, {1, 5}) (again note that the $2^{nd}$ column of the matrix $M_3$ corresponds with the $3^{rd}$ column of the original matrix $M_1$). Therefore, in this non-limiting example, Rule*[$\lambda_1$]=(Ø, {2, 3, 4}, {1, 5}).

(4.4.4) Function Split

As described briefly above, a label can be split into two new labels. The label is split when it is determined to not be a leaf node in the search tree (i.e., Function Test Leaf as described in further detail below). A leaf node is a node that is at an end of a branch in the search tree and has no child nodes. When a node is split, it creates at least two children nodes (i.e., child nodes). The (partial) function Split is defined on the set of the labels, where the value Split [$\lambda$] is a pair ($\lambda_0$, $\lambda_1$) of labels. Suppose that $\lambda$=(M, $T_1$, $T_2$). If $T_1 \cap T_2$={1, . . . n}, i.e., if $T_1 \cap T_2$ is the set of all columns of the matrix A, then the function Split is not defined. $\cap$ denotes the intersection of two sets (i.e., the set of elements common between two sets). Otherwise, let j∈$T_1 \cap T_2$ be a column of the original matrix A which is corresponded with a maximum-weight column of the submatrix M (if there are several such columns then the first one is chosen). ∉denotes a membership relation, where the left-hand side is not a member of the set in the right-hand side. Then, two new labels are defined by adding the $j^{th}$ column to the sets $T_1$ and $T_2$, respectively. More specifically, the two new labels are defined as follows:

$\lambda_0$=(Remove_0 [M, j], $T_1$, $T_2 \cup \{j\}$), $\lambda_1$=(Remove_1 [M, j], $T_1 \cup \{j\}$, $T_2$).

Using the above formulation, the Split function is defined as:

Split[$\lambda$]=(Rule*[$\lambda_0$],Rule*[$\lambda_1$]).

(4.4.5) Function Upper Bound

When solving the optimization problem (1), it is helpful to identify the range of solutions for the minimum diagnosis set. The range of solutions is defined by the upper bound and the lower bound. The Upper_Bound function is defined to find the number Upper_Bound [A] as an upper bound on the solution of the optimization problem (1). This function is extended to the set of labels as follows. For the label $\lambda$=(M, $T_1$, $T_2$), where M is a submatrix of the original matrix A, Upper_Bound [$\lambda$] provides an upper bound for the optimization problem defined by (1), augmented by the following conditions:

$x_j$=1, $x_j \in T_1$, and $x_j$=0, $x_j \in T_2$.

Applying the above, it can be shown that Upper_Bound [$\lambda$]=|$T_1$|+Upper_Bound [M].

In the special case that M=∅, Upper-Bound [$\lambda$]=|$T_1$|. Note that the function Upper_Bound is applied to both matrices and labels.

(4.4.6) Function Upper Bound Set

For the label $\lambda$=(M, $T_1$, $T_2$), the function Upper_Bound_Set [$\lambda$] returns the set which realizes the bound Upper_Bound [$\lambda$] (i.e., the union of $T_1$ and the set of columns of matrix M which provide the bound Upper_Bound [M]).

(4.4.7) Function Lower Bound

Like the previous function, the lower bound defined by (2) is extended to the set of labels. More specifically, for the label $\lambda$=(M, $T_1$, $T_2$), where M is a k×j submatrix of the original matrix A, Lower_Bound [$\lambda$]=|$T_1$|+k/$\|M\|_1$. In other words, a value for the lower bound of $\lambda$=(M, $T_{in}$, $T_{out}$) is equal to the size of $T_{in}$ plus k/L, where k is the number of rows of the matrix M and L is the maximum weight of the columns of M. That is, each column of M has a weight and the maximum weight is the largest among these numbers.

(4.4.8) Function Test Solution

This function is defined on the set of the labels and its value is either True or False. The value of Test_Solution [(M, $T_1$, $T_2$)] is True if the columns in the set $T_1$ form a solution for the optimization problem (1). Otherwise, the value of the function is False.

(4.4.9) Function Test Leaf

This function is defined on the set of the labels and its value is either True or False. Function Test_Leaf is used to determine whether or not a node in the search tree is a leaf (i.e., whether that node has any children or not). The arguments of this function include a label $\lambda$=(M, $T_1$, $T_2$) and a value U for the upper bound on the solution of the problem. The function is as follows:

$$\text{Test\_Leaf}[\lambda, U] = \begin{cases} \text{True} & \text{if } T_1 \cup T_2 = \{1, 2, \ldots, n\}, \text{ or} \\ \text{True} & \text{if Lower\_Bound}[\lambda] \geq U, \text{ or} \\ \text{True} & \text{if Test\_Solution}[\lambda] = \text{True}, \text{ or} \\ \text{True} & \text{if } M \text{ contains an all-zero row, or} \\ \text{False} & \text{otherwise.} \end{cases}$$

(4.4.8) The Branch-and-Bound Algorithm of the Present Invention

The present invention uses the above functions and terminology to create a Branch-and-Bound algorithm. The algorithm is described below for matrix A: /* solves the Hitting Set problem defined by the problem (1)*/

---

1. Labels ← {Rule* [(A, ∅, ∅)]}
2. U ← ∞           /*   upper bound    */
3. Solution ← ∅
4. while Labels ≠ ∅
5.     chose $\lambda$ = (M, $T_1$, $T_2$) ∈Labels
6.     Labels ← Labels − {$\lambda$}
7.     If Test_Solution [$\lambda$] = True & Upper_Bound [$\lambda$] < U then
8.         Solution ← $T_1$
9.         U ← Upper_Bound [$\lambda$]
10.    end if
11.    If Test_Solution [$\lambda$] = True & Upper_Bound [$\lambda$] = U & Solution=∅ then
           Solution ← $T_1$
12.    If Upper_Bound [$\lambda$] < U then
13.        U ← Upper_Bound [$\lambda$]
14.        Solution ← Upper_Bound_Set[$\lambda$]
15.    end if
16.    If Test_Leaf [$\lambda$, U] = False then
17.        ($\lambda_0$, $\lambda_1$) ← Split [$\lambda$]
18.        Labels ← Labels ∪ {$\lambda_0$, $\lambda_1$}
19.    end if
20.    If Test_Leaf [$\lambda$, U] = True & Upper_Bound [$\lambda$] = U & Solution=∅
21.        then Solution ← Upper_Bound_Set[$\lambda$]
22. end while
23. return Solution

---

For clarity, the following key can be used to define various functions and terminology used in the above algorithm:

Labels denotes the set of labels;
← denotes the substitution operation; the right-hand side is the new value of the left-hand side;
∅ denotes the empty set (null set);
U denotes the current best value of the upper bound;
∞ denotes the infinity;
Solution denotes the solution of the problem and the final output;
/* is a symbol that indicates that the sentence between a pair of "/* */" is a comment; and ∈ denotes a membership relation, where the left-hand side is a member of the set in the right-hand side.

As can be appreciated by one skilled in the art, the above terminology associated with each function is used for illustrative purposes only and can be changed provided the function provides the same or a similar result. Additionally, the above algorithm is a non-limiting example of pseud-code for achieving a solution and can be altered to provide the same result.

(4.5) Performance Results of the Present Invention Contrasted with a Traditional Branch-and-Bound Method FIG. 8 is a table illustrating the performance results of the algorithm of the present invention and its comparison with the traditional Branch-and-Bound method. A tool used for the traditional algorithm is the GLPK (GNU Linear Programming Kit), version 3.2. This is a set of routines in the ANSI C programming language. The Integer Programming routine of GLPK applies a variant of the Branch-and-Bound method for the problem of the present invention. The results shown in FIG. 8 illustrate the average time and the number of iterations (i.e., the number of nodes in the search tree) used by these algorithms on 100 random binary matrices.

For further illustration, consider the following 10×12 exemplary matrix:

$$A_0 = \begin{pmatrix} 0 & 0 & 0 & 0 & 0 & 1 & 0 & 0 & 1 & 0 & 0 \\ 0 & 0 & 0 & 0 & 1 & 0 & 0 & 0 & 0 & 0 & 1 \\ 0 & 0 & 0 & 1 & 1 & 0 & 0 & 1 & 0 & 1 & 1 \\ 0 & 0 & 1 & 0 & 0 & 0 & 1 & 0 & 0 & 1 & 0 \\ 0 & 0 & 1 & 1 & 1 & 0 & 0 & 1 & 1 & 1 & 0 \\ 0 & 1 & 0 & 0 & 1 & 0 & 0 & 1 & 1 & 0 & 1 & 0 \\ 0 & 1 & 0 & 1 & 0 & 1 & 1 & 0 & 1 & 0 & 0 & 0 \\ 1 & 0 & 0 & 1 & 0 & 1 & 1 & 1 & 0 & 0 & 0 \\ 1 & 0 & 1 & 0 & 0 & 0 & 0 & 1 & 0 & 0 & 1 & 0 \\ 1 & 1 & 1 & 0 & 0 & 0 & 0 & 1 & 0 & 1 & 0 & 1 \end{pmatrix}.$$

The nodes of the search tree and their labels are as follows.

(4.5.1) Node 0

For Node 0, the label of the root is $\lambda_0=(A_0, \emptyset, \emptyset)$. In this case, apply Rule*[$\lambda_0$]=$\lambda_0$. The initial lower and upper bounds are Lower_Bound=2, and U=Upper_Bound=5, where the upper bound is realized with the set $\{3, 4, 5, 6, 8\}$. Moreover, Test_Leaf $[\lambda_0, U]$=False, thus this node has two children (i.e., Node 1 and Node 2). To find the two children, notice that column 8 has a maximum weight, then;

$$\text{Remove\_0}[A_0, 8] = \begin{pmatrix} 0 & 0 & 0 & 0 & 0 & 1 & 0 & 0 & 1 & 0 & 0 \\ 0 & 0 & 0 & 0 & 1 & 0 & 0 & 0 & 0 & 0 & 1 \\ 0 & 0 & 0 & 1 & 1 & 0 & 0 & 1 & 0 & 1 & 1 \\ 0 & 0 & 1 & 0 & 0 & 0 & 1 & 0 & 0 & 1 & 0 \\ 0 & 0 & 1 & 1 & 1 & 0 & 0 & 1 & 1 & 1 & 0 \\ 0 & 1 & 0 & 0 & 1 & 0 & 0 & 1 & 0 & 1 & 0 \\ 0 & 1 & 0 & 1 & 0 & 1 & 1 & 1 & 0 & 0 & 0 \\ 1 & 0 & 0 & 1 & 0 & 1 & 1 & 1 & 0 & 0 & 0 \\ 1 & 0 & 1 & 0 & 0 & 0 & 0 & 1 & 0 & 0 & 1 & 0 \\ 1 & 1 & 1 & 0 & 0 & 0 & 0 & 1 & 0 & 1 & 0 & 1 \end{pmatrix} = A_1,$$

and $$\text{Remove\_1}[A_0, 8] = \begin{pmatrix} 0 & 0 & 0 & 0 & 0 & 1 & 0 & 0 & 1 & 0 & 0 \\ 0 & 0 & 0 & 0 & 1 & 0 & 0 & 0 & 0 & 0 & 1 \\ 0 & 0 & 0 & 1 & 1 & 0 & 0 & 1 & 0 & 1 & 1 \\ 0 & 0 & 1 & 0 & 0 & 0 & 1 & 0 & 0 & 1 & 0 \\ 0 & 1 & 0 & 1 & 0 & 1 & 1 & 1 & 0 & 0 & 0 \end{pmatrix}.$$

Note that none of the Rules 1-5 can be applied on the matrix Remove_0 $[A_0, 8]$. Additionally, only Rule 4 can be applied to Remove_1 $[A_0, 8]$ because the $1^{st}$ column of this matrix is an all-zero vector. Applying this rule results in the following matrix:

$$A_2 = \begin{pmatrix} 0 & 0 & 0 & 0 & 1 & 0 & 0 & 1 & 0 & 0 \\ 0 & 0 & 0 & 1 & 0 & 0 & 0 & 0 & 0 & 1 \\ 0 & 0 & 1 & 1 & 0 & 0 & 1 & 0 & 1 & 1 \\ 0 & 1 & 0 & 0 & 0 & 1 & 0 & 0 & 1 & 0 \\ 1 & 0 & 1 & 0 & 1 & 1 & 1 & 0 & 0 & 0 \end{pmatrix}.$$

Therefore, the labels of the children of Node 0 are $\lambda_1=(A_1, \emptyset, \{8\})$, and $\lambda_2=(A_2, \{8\}, \{1\})$.

(4.5.2) Node 1

The label for Node 1 is $\lambda_1$. The updated lower and upper bounds are Lower_Bound=2 and U=Upper_Bound=4. The upper bound is realized with the set $\{3, 5, 6, 9\}$, and Test_Leaf $[\lambda_1, U]$=False. Thus, Node 1 has two children (i.e., Node 3 and Node 4). Column 8 of the matrix $A_1$, which is the $9^{th}$ column of the original matrix $A_0$, has the maximum weight. Then, $$\text{Remove\_0}[A_1, 8] = \begin{pmatrix} 0 & 0 & 0 & 0 & 0 & 1 & 0 & 1 & 0 & 0 \\ 0 & 0 & 0 & 0 & 1 & 0 & 0 & 0 & 0 & 1 \\ 0 & 0 & 0 & 1 & 1 & 0 & 0 & 0 & 1 & 1 \\ 0 & 0 & 1 & 0 & 0 & 0 & 1 & 0 & 1 & 0 \\ 0 & 0 & 1 & 1 & 1 & 0 & 0 & 1 & 1 & 0 \\ 0 & 1 & 0 & 0 & 1 & 0 & 0 & 0 & 1 & 0 \\ 0 & 1 & 0 & 1 & 0 & 1 & 1 & 0 & 0 & 0 \\ 1 & 0 & 0 & 1 & 0 & 1 & 1 & 0 & 0 & 0 \\ 1 & 0 & 1 & 0 & 0 & 0 & 0 & 0 & 1 & 0 \\ 1 & 1 & 1 & 0 & 0 & 0 & 0 & 1 & 0 & 1 \end{pmatrix} = A_3,$$

and $$\text{Remove\_1}[A_1, 8] = \begin{pmatrix} 0 & 0 & 0 & 0 & 0 & 1 & 0 & 1 & 0 & 0 \\ 0 & 0 & 0 & 0 & 1 & 0 & 0 & 0 & 0 & 1 \\ 0 & 0 & 1 & 0 & 0 & 0 & 1 & 0 & 1 & 0 \\ 1 & 0 & 1 & 0 & 0 & 0 & 0 & 0 & 1 & 0 \\ 1 & 1 & 1 & 0 & 0 & 0 & 0 & 1 & 0 & 1 \end{pmatrix}.$$

None of the Rules 1-5 can be applied on the matrix $A_3$=Remove_0 $[A_1, 8]$. Additionally, only Rule 4 can be applied to Remove_1 $[A_1, 8]$ because $4^{th}$ column of this matrix, which is also the $4^{th}$ column of the original matrix $A_0$, is an all-zero vector. Applying this rule provides the following matrix:

$$A_4 = \begin{pmatrix} 0 & 0 & 0 & 0 & 0 & 1 & 0 & 1 & 0 & 0 \\ 0 & 0 & 0 & 0 & 1 & 0 & 0 & 0 & 0 & 1 \\ 0 & 0 & 1 & 0 & 0 & 0 & 1 & 0 & 1 & 0 \\ 1 & 0 & 1 & 0 & 0 & 0 & 0 & 0 & 1 & 0 \\ 1 & 1 & 1 & 0 & 0 & 0 & 0 & 1 & 0 & 1 \end{pmatrix}.$$

Therefore, the labels of the children of Node 1 are $\lambda_3 = (A_3, \emptyset, \{8, 9\})$, and $\lambda_4 = (A_4, \{9\}, \{4, 8\})$.

(4.5.3) Node 2

The label for Node 2 is $\lambda_2$. The updated lower and upper bounds are Lower_Bound2=4 and U=Upper_Bound=4. Since Lower_Bound=U and the function Test_Leaf $[\lambda_2, U]$=True, this node is a leaf of the search tree. Thus, no further splitting is done with this node.

(4.5.4) Node 3

The label for Node 3 is $\lambda_3$. The updated lower and upper bounds are Lower_Bound=2 and U=Upper_Bound=3. The upper bound is realized with the set $\{6, 11, 12\}$, and the function Test_Leaf $[\lambda_3, U]$=False. Thus, this node has two children (i.e., Node 5 and Node 6). Column 9 of the matrix $A_3$, which is the $11^{th}$ column of the original matrix $A_0$, has the maximum weight. Then, $$\text{Remove\_0}[A_3, 9] = \begin{pmatrix} 0 & 0 & 0 & 0 & 0 & 1 & 0 & 1 & 0 \\ 0 & 0 & 0 & 0 & 1 & 0 & 0 & 0 & 1 \\ 0 & 0 & 0 & 1 & 1 & 0 & 0 & 0 & 1 \\ 0 & 0 & 1 & 0 & 0 & 0 & 1 & 0 & 0 \\ 0 & 0 & 1 & 1 & 1 & 0 & 0 & 1 & 0 \\ 0 & 1 & 0 & 0 & 1 & 0 & 0 & 0 & 0 \\ 0 & 1 & 0 & 1 & 0 & 1 & 1 & 0 & 0 \\ 1 & 0 & 0 & 1 & 0 & 1 & 1 & 0 & 0 \\ 1 & 0 & 1 & 0 & 0 & 0 & 0 & 0 & 0 \\ 1 & 1 & 1 & 0 & 0 & 0 & 0 & 1 & 1 \end{pmatrix} = A_5,$$

and $$\text{Remove\_1}[A_3, 9] = \begin{pmatrix} 0 & 0 & 0 & 0 & 0 & 1 & 0 & 1 & 0 \\ 0 & 0 & 0 & 0 & 1 & 0 & 0 & 0 & 1 \\ 0 & 1 & 0 & 1 & 0 & 1 & 1 & 0 & 0 \\ 1 & 0 & 0 & 1 & 0 & 1 & 1 & 0 & 0 \\ 1 & 1 & 1 & 0 & 0 & 0 & 0 & 1 & 1 \end{pmatrix} = A_6.$$

None of the Rules 1-5 can be applied on the matrix Remove_0 $[A_3, 9]$ and Remove_1 $[A_3, 9]$. Therefore, the labels of the children of Node 3 are $\lambda_5 = (A_5, \emptyset, \{8, 9, 11\})$, and $\lambda_6 = (A_6, \{11\}, \{8, 9\})$.

(4.5.5) Node 4

The label for Node 4 is $\lambda_4$. The updated lower and upper bounds are Lower_Bound=3 and U=Upper_Bound=3. Since Lower_Bound=U and Test_Leaf $[\lambda_4, U]$=True, this node is a leaf of the search tree.

(4.5.6) Node 5

The label for Node 5 is $\lambda_5$. The updated lower and upper bounds are Lower_Bound=3 and U=Upper_Bound=3. Since the Lower_Bound=U and the function Test_Leaf $[\lambda_5, U]$=True, this node is a leaf of the search tree.

(4.5.7) Node 6

The label for Node 6 is $\lambda_6$. The updated lower and upper bounds are Lower_Bound=3 and U=Upper_Bound=3. Since the Lower_Bound=U and the function Test_Leaf $[\lambda_6, U]$=True, this node is a leaf of the search tree.

Figure 9:
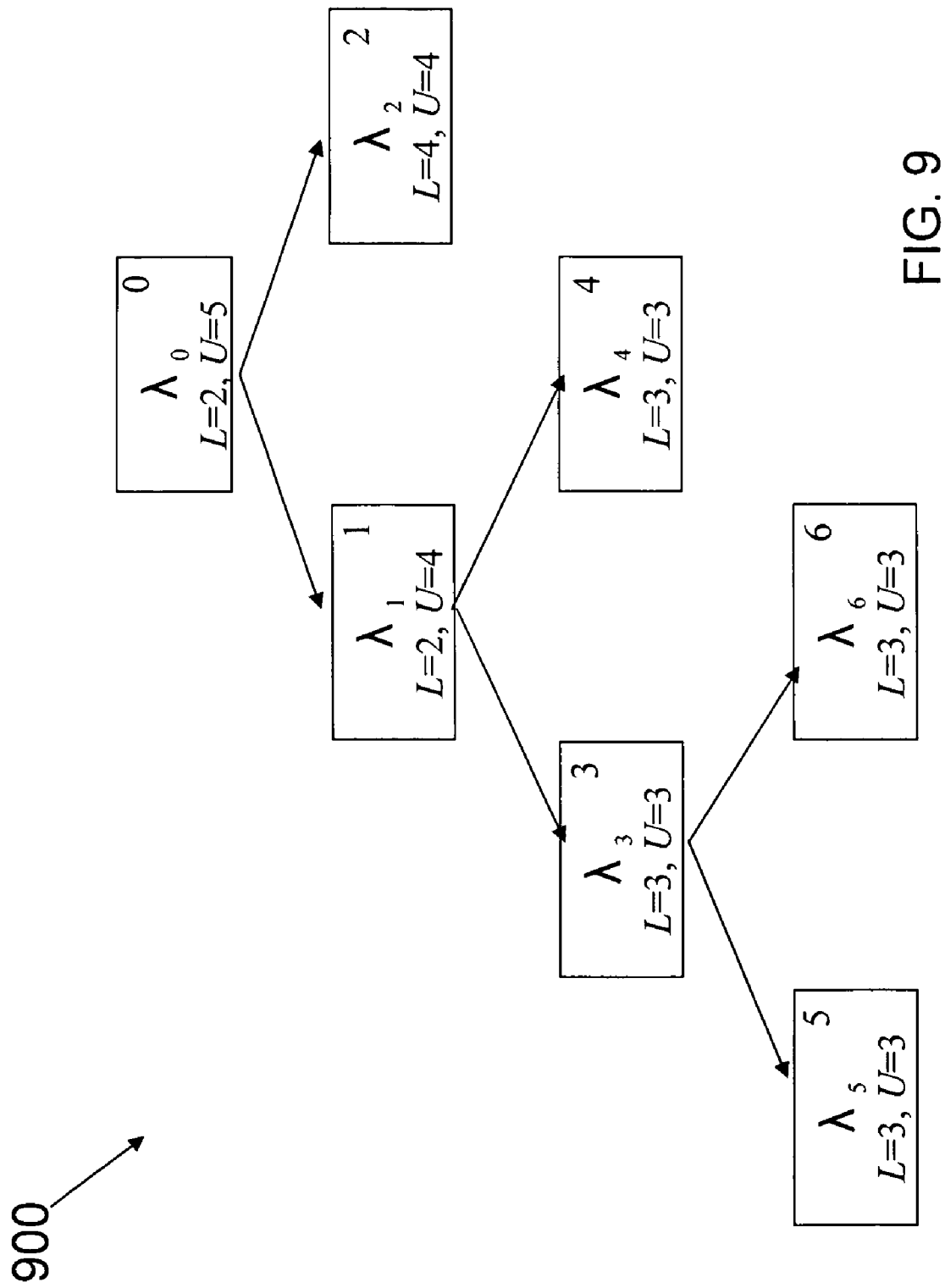
FIG. 9 is an illustration of an exemplary search tree.

Therefore, the minimal Hitting Set in this example is $\{6, 11, 12\}$ which is produced by Node 3. FIG. 9 is an illustration of an exemplary search tree 900, depicting the nodes and leafs of the above non-limiting example.

(4.6) Mapping other Problems into the Integer Programming Problem

The optimization problem formulated in system (1) not only covers the Hitting Set Problem, but it also covers several other important combinatorial optimization problems. For example, it can also be applied to the Set Covering Problem and the Vertex Cover Problem.

(4.6.1) The Set Covering Problem

The Set Covering Problem is formulated as follows. A collection $S=\{S_1, S_2, \ldots, S_n\}$ of subsets of a set $X=\{x_1, x_2, \ldots, x_m\}$ is given. Using the Set Covering Problem, a user can find the minimum number of sets from the collection S such that their union is the background set X. In this case, the rows of the incidence matrix A are labeled by the elements $x_1, x_2, \ldots, x_m$ and the columns by the sets $S_1, S_2, \ldots, S_n$. Thus, one skilled in the art can appreciate that the solution of the optimization problem (1) is indeed the solution of the Set Covering Problem.

(4.6.2) The Vertex Covering Problem

Figure 10:
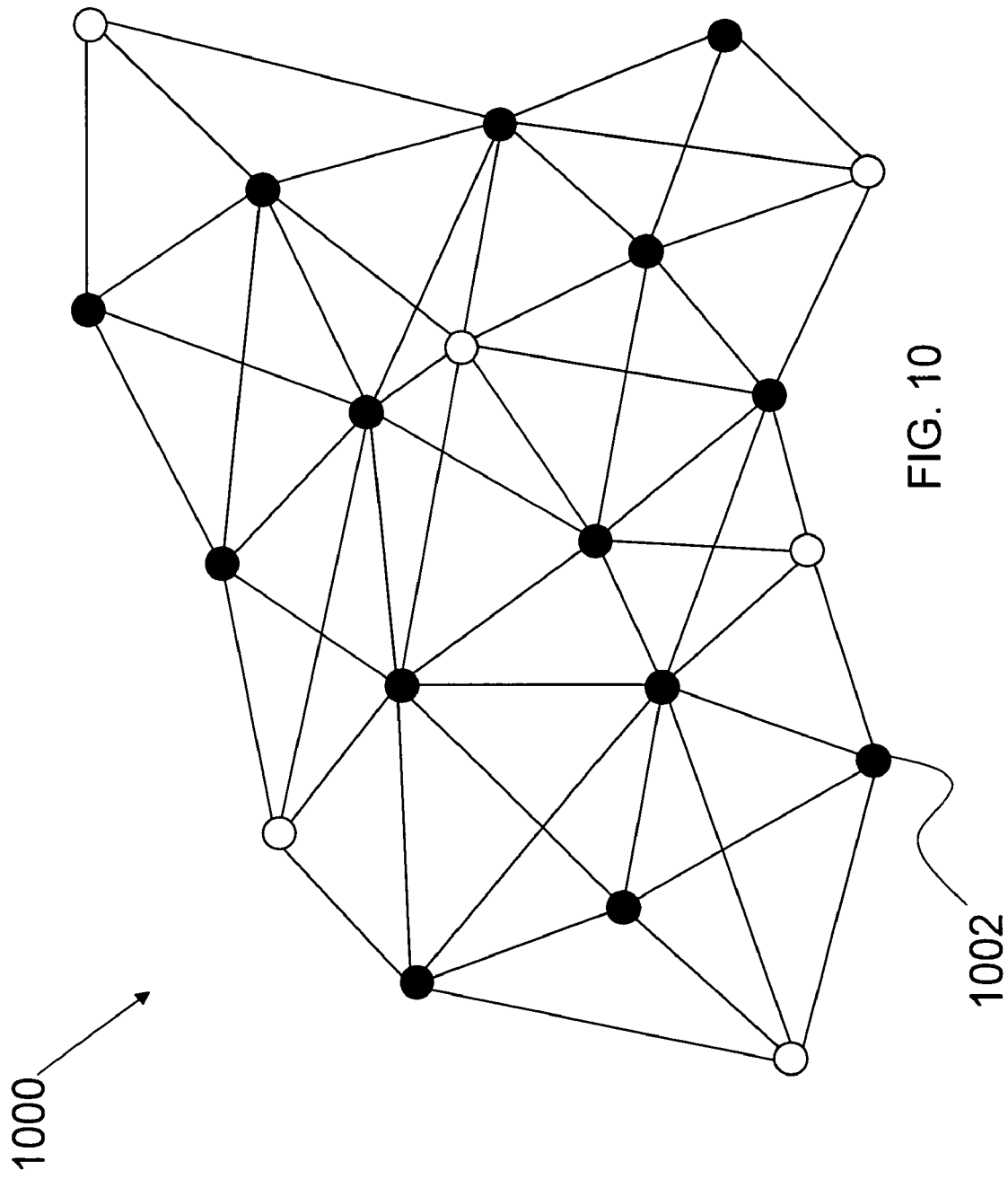
FIG. 10 is a graph illustrating an exemplary vertex cover as applied to a Vertex Covering Problem.

The Vertex Covering Problem is formulated as follows. Given a graph $G=(V, E)$, with the vertices $V=\{v_1, v_2, \ldots, v_n\}$ and edges $E=\{e_1, e_2, \ldots, e_m\}$, find a minimum size set of vertices $U \subseteq V$ such that for every edge $e_j \in E$, at least one of the endpoints belongs to the set U. FIG. 10 illustrates a graph 1000 and its vertex cover, with the set of black vertices 1002 being a minimal covering of this graph 1000.

In this problem, the rows of the incidence matrix A are labeled by the edges $e_1, e_2, \ldots, e_m$ and the columns by the vertices $v_1, v_2, \ldots, v_n$. In the row which is labeled by the edge $e_j$, there are exactly two entries equal to 1 and those correspond with the endpoints of the edge $e_j$. As can be appreciated by one skilled in the art, the solution of the optimization problem (1) is again the solution of the Vertex Cover Problem.

Figure 11:
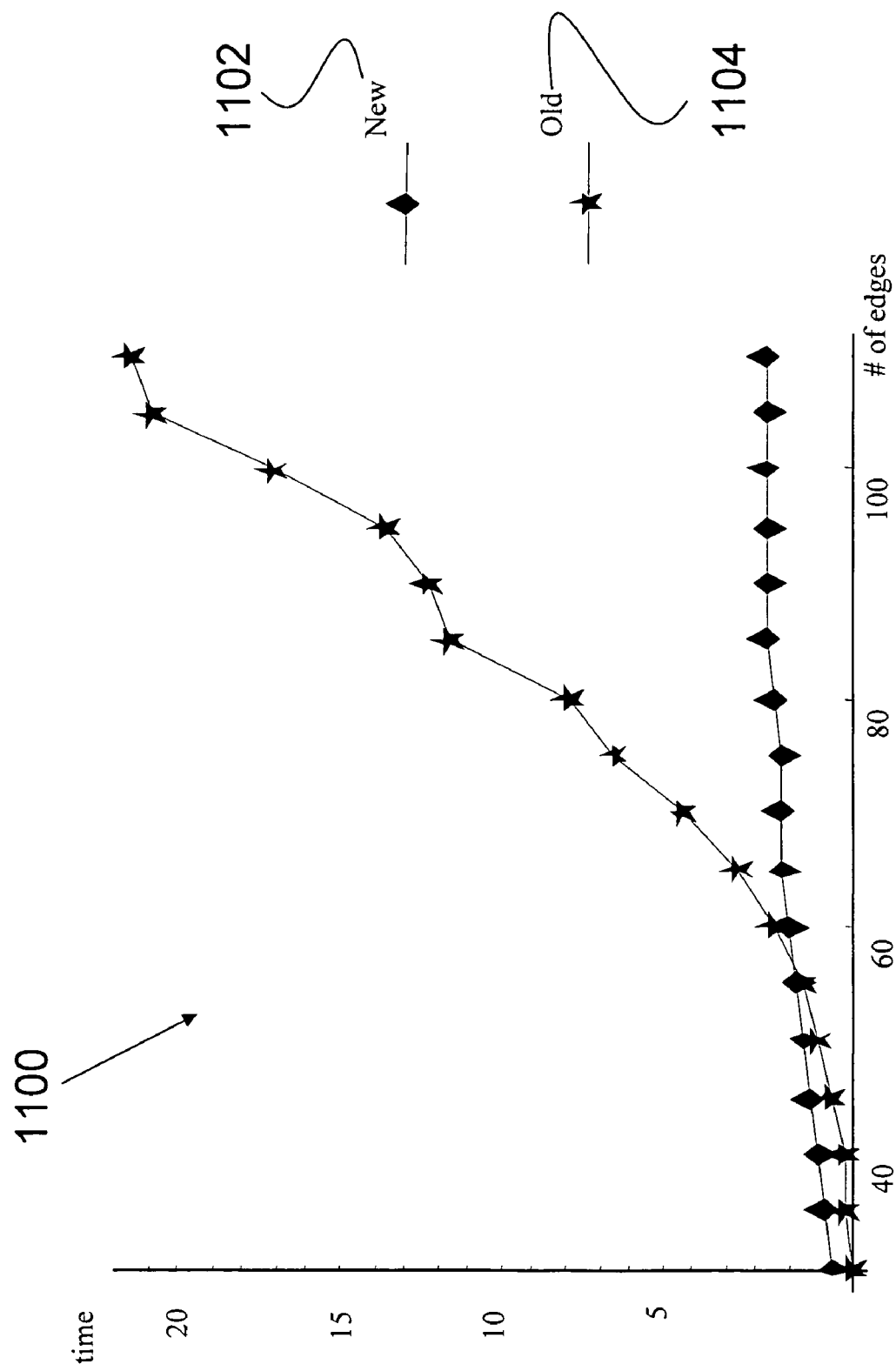
FIG. 11 is a graph illustrating the performance of the algorithms of the present invention contrasted with the traditional technique for solving a Vertex Covering Problem.

For further illustration, FIG. 11 is a graph 1100 showing the performance of the algorithms of the present invention (i.e., "new" 1102) contrasted with the traditional one (i.e., "old" 1104) for solving this problem. In this example, the algorithms are applied to 100 random graphs with 30 vertices and different number of edges, with the average time of each algorithm being presented. As shown in FIG. 11, the algorithm of the present invention is substantially faster in solving complex problems than traditional approaches.

(4.7) Summary and Conclusions

The present invention provides a new approach to overcome one of the major limitations of the current model-based diagnosis techniques (i.e., the exponential complexity of calculation of minimal diagnosis set). To overcome this challenging limitation, the present invention describes an algorithmic approach for calculating the minimal diagnosis set. Starting with the relationship between the calculation of minimal diagnosis set and the Hitting Set problem, the present invention includes a method for solving the Hitting Set Problem, and consequently the diagnosis problem. This method is based on a powerful and yet simple representation of the problem that enables its mapping onto another well-known problem, that is, the 0/1 Integer Programming problem.

Mapping onto the 0/1 Integer Programming problem enables the use of variety of algorithms that can efficiently solve the problem for up to several thousand components. Therefore, the algorithm of the present invention provides a significant improvement over existing ones, enabling the efficient diagnosis of large, complex systems. In addition, this mapping enables a priori and fast determination of the lower and upper bounds on the solution (i.e., the minimum number of faulty components) before solving the problem. This is exploited to develop a more powerful algorithm for the problem. The new algorithm is an improvement of the well-known Branch-and-Bound method. The results of the performance of the new algorithm are presented on a set of test cases. The results show the advantage of the new algorithm over the traditional Branch-and-Bound algorithm. More specifically, the algorithm of the present invention has achieved more than 10 times the speed of standard algorithms.

What is claimed is:

1. A method for calculating a minimal Hitting Set from a collection of sets, comprising using a computer system to analyze a system having a collection of sets to derive the minimal Hitting Set from the collection of sets, the computer system being configured to perform acts of:
  receiving information regarding the collection of sets from the system;
  creating an incidence matrix of the collection of sets;
  creating nodes from the incidence matrix such that each node is a node in a search tree and has a label that includes a sub-matrix of the incidence matrix, and two disjoint subsets of the columns of the incidence matrix;
  calculating an upper bound and calculating a lower bound for each label, where the upper bound and lower bound define a range of solutions for the minimal Hitting Set; and
  determining whether each label has any child nodes or is a leaf node without any child nodes;
    if the label does not have any child nodes, then stop and designate the label as a leaf node;
    if the label does have a child node, splitting the label to create two new labels;
  repeating acts of calculating and determining until all labels have been designated as leaf nodes;
  determining a solution of the Hitting Set with information gathered from leaf nodes; and
  providing an indication of the Hitting set to a user.

2. A method for calculating a minimal Hitting Set as set forth in claim 1, wherein in the act of calculating the minimal Hitting Set, the minimal Hitting Set is a minimal diagnosis set and the collection of sets is a collection of conflict sets, such that the method for calculating a minimal Hitting Set calculates a solution for a diagnosis problem.

3. A method for calculating a minimal Hitting Set as set forth in claim 2, wherein in the act of creating an incidence matrix, the incidence matrix is created as a binary matrix denoted as m×n binary matrix A having columns and rows, where the columns of matrix A are labeled by numbers 1, 2, . . . ,n, and where any subset of these columns are denoted as a subset of $\{1,2, \ldots ,n\}$.

4. A method for calculating a minimal Hitting Set as set forth in claim 3, wherein in the act of creating nodes, each node has a label ($\lambda$) in a form of $\lambda=(M, T_{in}, T_{out})$, where M is a sub-matrix of matrix A, and where $T_{in}$ and $T_{out}$ are disjoint subsets of the columns of matrix A, where $T_{in}$ denotes a set of columns of matrix A considered as part of the minimal diagnosis set, and where $T_{out}$ denotes a set of columns of matrix A that are considered not as part of the minimal diagnosis set.

5. A method for calculating a minimal Hitting Set as set forth in claim 4, wherein the act of calculating an upper bound further comprises acts of calculating a value for the upper bound of $\lambda=(M, T_{in}, T_{out})$ and a calculating an upper bound set, by performing the following acts:
  initializing the value of the upper bound as U=size of $T_{in}$ and initializing the upper bound set as the set $T_{in}$, where the size of $T_{in}$ is the number of elements in $T_{in}$;
  choosing a column $a_1$ of M with a maximum weight, where the column with the maximum weight is the column of M with the largest number of 1's;
  increasing the value of U by 1 and adding the column $a_1$ to the upper bound set;
  constructing the matrix $M_1$ from M by deleting the column $a_1$ and all rows of M that correspond with non-zero components of the column $a_1$, where if the matrix $M_1$ is empty then the current value of U is the upper bound and a solution for the Hitting Set is the upper bound set; otherwise
  repeating the acts of choosing through repeating on the matrix $M_1$.

6. A method for calculating a minimal Hitting Set as set forth in claim 5, wherein in the act of calculating a lower bound, a value for the lower bound of $\lambda=(M, T_{in}, T_{out})$ is equal to the size of $T_{in}$ plus k/L, where k is the number of rows of the matrix M and L is the maximum weight of the columns of M.

7. A method for calculating a minimal Hitting Set as set forth in claim 6, wherein in the act of determining whether each label has any child nodes or is a leaf node without any child nodes, a label is determined to be a leaf node if any of the following are true:
  if $T_{in} \cup T_{out} = \{1,2, \ldots ,n\}$, where $\cup$ denotes the union of two sets;
  if the value for the lower bound of $\lambda \geq$ the current value for the upper bound;
  if the columns of $T_{in}$ form a solution such that if the columns in $T_{in}$ are added together to form a resulting vector, then the resulting vector has no zero component; or
  if M contains an all-zero row.

8. A method for calculating a minimal Hitting Set as set forth in claim 7, wherein the act of splitting the label to create two new labels further comprises an act of splitting label $\lambda=(M, T_{in}, T_{out})$ into label $\lambda_0$ and label $\lambda_1$;
  where label $\lambda_0$ is defined as:

$\lambda_0 = (\text{Remove}\_0 [M, j,], T_{in}, T_{out} \cup \{\hat{j}\})$, where j denotes a column of M with a maximum weight and $\hat{j}$ is the corresponding column in the original matrix, and where Remove_0 [M, j] denotes a sub-matrix of M obtained by deleting the $j^{th}$ column of M; and
  where label $\lambda_1$ is defined as:

$\lambda_1 = (\text{Remove}\_1 [M, j], T_{in} \cup \{\hat{j}\}, T_{out})$, where j denotes a column of M with a maximum weight and $\hat{j}$ is the corresponding column in the original matrix, and Remove_1 [M, j] denotes a sub-matrix of M obtained by deleting the $j^{th}$ column of M and deleting all rows of M that correspond with non-zero components of that column.

9. A method for calculating a minimal Hitting Set as set forth in claim 8, wherein the act of splitting a label further comprises acts of:

on label $\lambda=(M, T_{in}, T_{out})$, if the $j^{th}$ column of the matrix M is an all-one column, then changing the label $\lambda$ to the label $(\{ \}, T_{in}\cup\{\hat{j}\}, T_{out})$, where $\cup$ denotes the union of two sets, $\{ \}$ is an empty matrix and $\hat{j}$ is a corresponding column in the original matrix;

on label $\lambda=(M, T_{in}, T_{out})$, if the matrix M has a row of weight one, with 1 as its $j^{th}$ component, then changing the label $\lambda$ to the label (Remove_1 [M, j], $T_{in}\cup\{\hat{j}\}$, $T_{out}$) where $\cup$ denotes the union of two sets, $\hat{j}$ is the corresponding column in the original matrix, and Remove_1 [M, j] denotes a sub-matrix of M obtained by deleting the $j^{th}$ column of M and deleting all rows of M that correspond with non-zero components of that column;

on label $\lambda=(M, T_{in}, T_{out})$, if the matrix M has an all-one row, then deleting that row;

on label $\lambda=(M, T_{in}, T_{out})$, if $j^{th}$ column of the matrix M is an all-zero column, then changing the label $\lambda$ to the label (Remove_0 [M, j], $T_{in}$, $T_{out}\cup\{\hat{j}\}$), where $\cup$ denotes the union of two sets, $\hat{j}$ is the corresponding column in the original matrix, and Remove_0 [M, j] denotes a sub-matrix of M obtained by deleting the $j^{th}$ column of M;

on label $\lambda=(M, T_{in}, T_{out})$, if the matrix M has two equal rows, then deleting one of them; and repeating the acts of claim 9 until all of the acts of claim 9 are exhausted.

10. A method for calculating a minimal Hitting Set as set forth in claim 9, further comprising an act of applying a Branch-and-Bound technique to the incidence matrix A to find an optimal solution for the problem, comprising acts of:

initializing a label $\lambda_0$ as $\lambda_0$=Rules*[{A, { }, { }}], where Rules* denotes applying and repeating the acts of claim 9 until all of the acts of claim 9 are exhausted;

initializing a set of labels as $\{\lambda_0\}$;

initializing a value of the upper bound U as the upper bound of $\lambda_0$;

initializing a solution set as the upper bound set of $\lambda_0$;

choosing a label $\lambda$ from the set of labels;

deleting $\lambda$ from the set of labels;

computing $U_1$ as the upper bound of $\lambda$ and its corresponding upper bound set;

if $U_1<U$, then changing the value of U to $U_1$ and the value of the solution set to the upper bound set;

if the label $\lambda$ is not a leaf, then splitting $\lambda$ to labels $\lambda_0$ and $\lambda_1$ and adding the new labels $\lambda_0$ and $\lambda_1$ to the set of labels;

if the set of labels is not empty, repeating the acts of choosing a label $\lambda$ through the act of repeating the acts;

if the set of labels is empty, then the outputting is the solution set and stopping.

11. A computer program product for calculating a minimal Hitting Set from a collection of sets, the computer program product comprising computer-readable instruction means stored on a computer-readable medium for causing a computer to:

receive information regarding the collection of sets from the system;

create an incidence matrix of the collection of sets;

create nodes from the incidence matrix such that each node is a node in a search tree and has a label that includes a sub-matrix of the incidence matrix, and two disjoint subsets of the columns of the incidence matrix;

calculate an upper bound and calculating a lower bound for each label, where the upper bound and lower bound define a range of solutions for the minimal Hitting Set; and determine whether each label has any child nodes or is a leaf node without any child nodes;

if the label does not have any child nodes, then stop and designate the label as a leaf node;

if the label does have a child node, splitting the label to create two new labels;

repeating operations of calculating and determining until all labels have been designated as leaf nodes;

determining a solution of the Hitting Set with information gathered from leaf nodes; and providing an indication of the Hitting set to a user.

12. A computer program product for calculating a minimal Hitting Set as set forth in claim 11, wherein when calculating the minimal Hitting Set, the minimal Hitting Set is a minimal diagnosis set and the collection of sets is a collection of conflict sets, such that the computer program product is configured to calculate a solution for a diagnosis problem.

13. A computer program product for calculating a minimal Hitting Set as set forth in claim 12, wherein when creating an incidence matrix, the incidence matrix is created as a binary matrix denoted as m×n binary matrix A having columns and rows, where the columns of matrix A are labeled by numbers 1,2, . . . ,n, and where any subset of these columns are denoted as a subset of $\{1,2, \ldots ,n\}$, and wherein when creating nodes, each node has a label ($\lambda$) in a form of $\lambda=(M, T_{in}, T_{out})$, where M is a sub-matrix of matrix A, and where $T_{in}$ and $T_{out}$ are disjoint subsets of the columns of matrix A, where $T_{in}$ denotes a set of columns of matrix A considered as part of the minimal diagnosis set, and where $T_{out}$ denotes a set of columns of matrix A that are considered not as part of the minimal diagnosis set.

14. A computer program product for calculating a minimal Hitting Set as set forth in claim 13, wherein when calculating an upper bound, the computer program product is further configured to cause a computer to perform operations of calculating a value for the upper bound of $\lambda=(M, T_{in}, T_{out})$ and a calculating an upper bound set, by performing the following operations:

initializing the value of the upper bound as U=size of $T_{in}$ and initializing the upper bound set as the set $T_{in}$, where the size of $T_{in}$ is the number of elements in $T_{in}$;

choosing a column $a_1$ of M with a maximum weight, where the column with the maximum weight is the column of M with the largest number of 1's;

increasing the value of U by 1 and adding the column $a_1$ to the upper bound set;

constructing the matrix $M_1$ from M by deleting the column $a_1$ and all rows of M that correspond with non-zero components of the column $a_1$, where if the matrix $M_1$ is empty then the current value of U is the upper bound and a solution for the Hitting Set is the upper bound set; otherwise repeating the operations of choosing through repeating on the matrix $M_1$.

15. A computer program product for calculating a minimal Hitting Set as set forth in claim 14, wherein when calculating a lower bound, a value for the lower bound of $\lambda=(M, T_{in}, T_{out})$ is equal to the size of $T_{in}$ plus k/L, where k is the number of rows of the matrix M and L is the maximum weight of the columns of M.

16. A computer program product for calculating a minimal Hitting Set as set forth in claim 15, wherein when determining whether each label has any child nodes or is a leaf node without any child nodes, the computer program product is configured to cause a computer to determine a label to be a leaf node if any of the following are true:

if $T_{in} \cup T_{out} = \{1, 2, \ldots, n\}$, where $\cup$ denotes the union of two sets;

if the value for the lower bound of $\lambda \geqq$ the current value for the upper bound;

if the columns of $T_{in}$ form a solution such that if the columns in $T_{in}$ are added together to form a resulting vector, then the resulting vector has no zero component; or if M contains an all-zero row.

17. A computer program product for calculating a minimal Hitting Set as set forth in claim 16, wherein when splitting the label to create two new labels, the computer program product is further configured to cause a computer to perform an operation of splitting label $\lambda = (M, T_{in}, T_{out})$ into label $\lambda_0$ and label $\lambda_1$;

where label $\lambda_0$ is defined as:

$$\lambda_0 = (\text{Remove\_0 }[M, j], T_{in}, T_{out} \cup \{\hat{j}\}),$$

where j denotes a column of M with a maximum weight and $\hat{j}$ is the corresponding column in the original matrix, and where Remove\_0 [M, j] denotes a sub-matrix of M obtained by deleting the $j^{th}$ column of M; and where label $\lambda_1$ is defined as:

$$\lambda_1 = (\text{Remove\_1 }[M, j], T_{in} \cup \{\hat{j}\}, T_{out}),$$

where j denotes a column of M with a maximum weight and $\hat{j}$ is the corresponding column in the original matrix, and Remove\_1 [M, j] denotes a sub-matrix of M obtained by deleting the $j^{th}$ column of M and deleting all rows of M that correspond with non-zero components of that column.

18. A computer program product for calculating a minimal Hitting Set as set forth in claim 17, wherein when splitting a label, the computer program product further comprises instruction means for causing a computer to perform operations of:

on label $\lambda = (M, T_{in}, T_{out})$, if the $j^{th}$ column of the matrix M is an all-one column, then changing the label $\lambda$ to the label $(\{\}, T_{in} \cup \{\hat{j}\}, T_{out})$, where $\cup$ denotes the union of two sets, { } is an empty matrix and $\hat{j}$ is a corresponding column in the original matrix;

on label $\lambda = (M, T_{in}, T_{out})$, if the matrix M has a row of weight one, with 1 as its $j^{th}$ component, then changing the label $\lambda$ to the label (Remove\_1 [M, j], $T_{in} \cup \{\hat{j}\}$, $T_{out}$) where $\cup$ denotes the union of two sets, $\hat{j}$ is the corresponding column in the original matrix, and Remove\_1 [M, j] denotes a sub-matrix of M obtained by deleting the $j^{th}$ column of M and deleting all rows of M that correspond with non-zero components of that column;

on label $\lambda = (M, T_{in}, T_{out})$, if the matrix M has an all-one row, then deleting that row;

on label $\lambda = (M, T_{in}, T_{out})$, if $j^{th}$ column of the matrix M is an all-zero column, then changing the label $\lambda$ to the label (Remove\_0 [M, j], $T_{in}$, $T_{out} \cup \{\hat{j}\}$), where $\cup$ denotes the union of two sets, $\hat{j}$ is the corresponding column in the original matrix, and Remove\_0 [M, j] denotes a sub-matrix of M obtained by deleting $j^{th}$ column of M;

on label $\lambda = (M, T_{in}, T_{out})$, if the matrix M has two equal rows, then deleting one of them; and repeating operations of claim 19 until all of the operations of claim 19 are exhausted.

19. A computer program product for calculating a minimal Hitting Set as set forth in claim 18, further comprising instruction means for causing a computer to perform an operation of applying a Branch-and-Bound technique to the incidence matrix A to find an optimal solution for the problem, comprising operations of:

initializing a label $\lambda_0$ as $\lambda_0 = \text{Rules}^*[\{A, \{\}, \{\}\}]$, where Rules* denotes applying and repeating the operations of claim 19 until all of the operations of claim 19 are exhausted;

initializing a set of labels as $\{\lambda_0\}$;

initializing a value of the upper bound U as the upper bound of $\lambda_0$;

initializing a solution set as the upper bound set of $\lambda_0$;

choosing a label $\lambda$ from the set of labels;

deleting $\lambda$ from the set of labels;

computing $U_1$ as the upper bound of $\lambda$ and its corresponding upper bound set;

if $U_1 < U$, then changing the value of U to $U_1$ and the value of the solution set to the upper bound set;

if the label $\lambda$ is not a leaf, then splitting $\lambda$ to labels $\lambda_0$ and $\lambda_1$ and adding the new labels $\lambda_0$ and $\lambda_1$ to the set of labels;

if the set of labels is not empty, repeating the operations of choosing a label $\lambda$ through the operation of repeating the operations;

if the set of labels is empty, then the outputting is the solution set and stopping.

20. A computer program system for calculating a minimal diagnosis set from a collection of conflict sets, the computer system being configured to perform operations of:

creating an incidence matrix of the collection of sets;

creating nodes from the incidence matrix such that each node is a node in a search tree and has a label that includes a sub-matrix of the incidence matrix, and two disjoint subsets of the columns of the incidence matrix;

calculating an upper bound and calculating a lower bound for each label, where the upper bound and lower bound define a range of solutions for the minimal Hitting Set; and determining whether each label has any child nodes or is a leaf node without any child nodes;

if the label does not have any child nodes, then stop and designate the label as a leaf node;

if the label does have a child node, splitting the label to create two new labels;

repeating acts of calculating and determining until all labels have been designated as leaf nodes;

determining a solution of the Hitting Set with information gathered from leaf nodes; and providing an indication of the Hitting set to a user.

* * * * *